(12) United States Patent
Aoki

(10) Patent No.: US 12,500,358 B2
(45) Date of Patent: Dec. 16, 2025

(54) ANTENNA APPARATUS

(71) Applicant: DENSO CORPORATION, Kariya (JP)

(72) Inventor: Kazuhiro Aoki, Kariya (JP)

(73) Assignee: DENSO CORPORATION, Kariya (JP)

(*) Notice: Subject to any disclaimer, the term of this patent is extended or adjusted under 35 U.S.C. 154(b) by 0 days.

(21) Appl. No.: 18/337,676

(22) Filed: Jun. 20, 2023

(65) Prior Publication Data

US 2023/0335923 A1  Oct. 19, 2023

Related U.S. Application Data

(63) Continuation of application No. PCT/JP2021/046994, filed on Dec. 20, 2021.

(30) Foreign Application Priority Data

Dec. 21, 2020 (JP) ................. 2020-211654

(51) Int. Cl.
*H01Q 25/00* (2006.01)
*H01Q 1/32* (2006.01)

(52) U.S. Cl.
CPC ............. *H01Q 25/001* (2013.01); *H01Q 1/32* (2013.01)

(58) Field of Classification Search
CPC .......... H01Q 25/001; H01Q 1/32; H01Q 3/38; H01Q 21/0075; H01Q 21/08; G01S 7/02
See application file for complete search history.

(56) References Cited

U.S. PATENT DOCUMENTS

| | | | |
|---|---|---|---|
| 8,665,137 B2 * | 3/2014 | Wintermantel | G01S 13/343 342/188 |
| 11,977,146 B2 * | 5/2024 | Kagimoto | G01S 13/426 |
| 2017/0234971 A1 * | 8/2017 | Arai | H04B 17/12 342/174 |
| 2019/0165460 A1 | 5/2019 | Shiozaki et al. | |
| 2020/0052396 A1 * | 2/2020 | Sakai | H01Q 15/24 |
| 2020/0326421 A1 * | 10/2020 | Aoki | G01S 13/878 |
| 2020/0379083 A1 | 12/2020 | Lee | |
| 2022/0069477 A1 * | 3/2022 | Maruyama | H01Q 13/206 |

* cited by examiner

*Primary Examiner* — Seokjin Kim
(74) *Attorney, Agent, or Firm* — Maschoff Brennan

(57) ABSTRACT

An antenna apparatus includes a first antenna, a second antenna, and a third antenna. Each of the second antenna and the third antenna transmits a radio-wave signal in a predetermined emitting direction. The first antenna receives a reflection signal resulting from the transmission signal transmitted in the predetermined emitting direction. The second antenna and the third antenna are arranged to be separate from one another in a second direction. The second antenna and the first antenna are arranged to be separate from each other in the first direction, and at least partially overlap each other as viewed in a first direction.

8 Claims, 16 Drawing Sheets

ANTENNA APPARATUS

REFERENCE TO RELATED APPLICATIONS

The present application is a bypass continuation application of currently pending international application No. PCT/JP2021/046994 filed on Dec. 20, 2021 designating the United States of America, the entire disclosure of which is incorporated herein by reference, the internal application being based on and claiming the benefit of priority from Japanese Patent Application No. 2020-211654 filed on Dec. 21, 2020.

TECHNICAL FIELD

The present disclosure relates to antenna apparatuses.

BACKGROUND OF THE INVENTION

US Patent Publication NO. 8665137B2 discloses an antenna apparatus installed in a vehicle. The antenna apparatus disclosed in the US patent publication includes two transmitter antennas and four receiver antennas mounted on a planar surface of a board. Each of the transmitter antennas emits a transmission-wave signal, and the receiver antennas receive transmission-wave signals, i.e., reflection-wave signals, reflected at objects.

The two transmitter antennas and four receiver antennas are mounted on the planar surface of the board in accordance with the following design requirements:
 (I) The four receiver antennas are arranged at regular distances D in a first spatial direction R that extends along the planar surface of the board
 (II) The two transmitter antennas are arranged at a predetermined distance 4D in the first spatial direction R
 (III) The four receiver antennas are arranged so that phase centers of the respective four receiver antennas lie between phase centers of the two transmitter antennas in the first special direction R Specifically, the two transmitter antennas are offset in a second special direction S with respect to the locations of the four receiver antennas; the second special direction S extends along the planar surface of the board and is perpendicular to the first spatial direction R.

SUMMARY OF THE INVENTION

The inventors have studied in detail the antenna apparatus disclosed in the US patent publication, and thereafter have found out a problem described hereinafter.

That is, the two transmitter antennas are arranged to be completely separate from the four receiver antennas in the second spatial direction S, resulting in the antenna apparatus being upsized.

The upsizing of the antenna apparatus has a certain amount of impact on the vehicle in which the antenna apparatus is installed. Specifically, the body of the vehicle in which the antenna apparatus is installed requires individual two signal-transmissive ports that enable the transmission-wave signals emitted from the two transmitter antennas to pass therethrough toward the front direction of the vehicle. Additionally, the body of the vehicle requires individual four signal-transmissive ports that enable reflection-wave signals arriving at the vehicle to pass therethrough toward the respective four receiver antennas.

That is, relatively large signal-transmissive ports need be individually provided through the body of the vehicle to enable transmission-wave signals emitted from the antenna apparatus to pass therethrough or reflection-wave signals reflected at objects to pass therethrough.

If the four receiver antennas were arranged between the two transmitter antennas, the upsizing of the antenna apparatus might be avoided. However, because the distance 4D between the two transmitter antennas in the first spatial direction R is shorter than the total length of the four receiver antennas in the first special direction R, it may be physically difficult to arrange the four receiver antennas between the two transmitter antennas.

One aspect of the present disclosure seeks to preferably provide antenna apparatuses, each of which includes one or more transmitter antennas and one or more receiver antennas; these antenna apparatuses are each designed to have a smaller size.

An exemplary measure of the present disclosure provides an antenna apparatus. The antenna apparatus includes at least one first antenna, at least one second antenna, and at least one third antenna.

The at least one first antenna has a reference plane and is configured to perform one of (I) transmission of a radio-wave signal in a predetermined emitting direction, and (II) reception of a reflection signal resulting from the transmission signal transmitted in the predetermined emitting direction. The predetermined emitting direction intersects with the reference plane and has a vector component in a first direction that is perpendicular to the reference plane.

The at least one second antenna is configured to perform the other of the transmission of the radio-wave signal and the reception of the reflection signal. The at least one third antenna is configured to perform the other of the transmission of the radio-wave signal and the reception of the reflection signal. The at least one third antenna is arranged to be separate from the at least one second antenna in a second direction that extends parallel along the reference plane.

That is, if the at least one first antenna is configured to perform transmission of the radio-wave signal, each of the at least one second antenna and the at least one third antenna is configured to perform reception of the reflection signal resulting from the radio-wave signal transmitted from the at least one first antenna. Otherwise, if each of the at least one second antenna and the at least one third antenna is configured to perform transmission of the radio-wave signal, the at least one first antenna is configured to perform reception of the reflection signal resulting from the radio-wave signal transmitted from each of the at least one second antenna and the at least one third antenna.

At least two of the at least one first antenna, the at least one second antenna, and the at least one third antenna are arranged to be separate from each other in the first direction, and at least partially overlap each other as viewed in the first direction.

Note that a situation where an antenna A and an antenna B overlap each other can include
 (I) A first situation where the antenna A and the antenna B actually, i.e., physically, overlap each other
 (II) A second situation where an aperture of the antenna A and an aperture of the antenna B at least partially overlap each other The aperture of an antenna has, for example, a rectangular shape substantially circumscribed around the outline of the antenna, and extends in a direction parallel or perpendicular to a polarization direction of the antenna. That is, the aperture of the first antenna has, for example, a rectangular shape substantially circumscribed around the outline of the first antenna, and extends in a direction parallel or perpendicular to the polarization direction of the first antenna The at least one first antenna, the at least one second antenna, and the at least one third antenna are not arranged on the same plane.

That is, at least two of the at least one first antenna, the at least one second antenna, and the at least one third antenna are arranged to overlap each other as viewed in the first direction.

As compared with a comparative case where the at least one first antenna, the at least one second antenna, and the at least one third antenna are arranged on a region of the same plane, the above arrangement according to the exemplary measure enables, as viewed in the first direction, a region in which the at least one first antenna, the at least one second antenna, and the at least one third antenna are arranged to be smaller, resulting in the antenna apparatus having a smaller size.

DETAILED DESCRIPTION

The following describes embodiments of the present disclosure with reference to the accompanying drawings.

First Embodiment

Summary of Radar Apparatus

Figure 1:
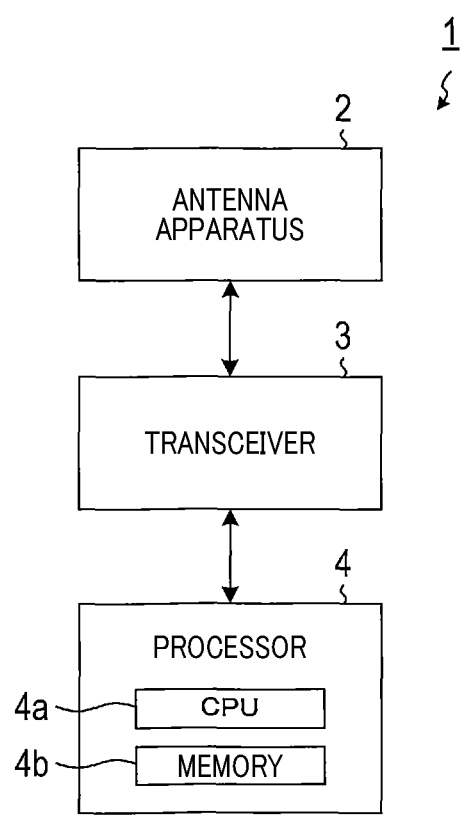
FIG. 1 is a block diagram illustrating the configuration of a radar apparatus of the first embodiment.

The following describes a radar apparatus 1 according to the first embodiment illustrated in FIG. 1 is installable in, for example, a vehicle. The radar apparatus 1 can be used to detect, for example, various objects located around the vehicle. The radar apparatus 1 according to the first embodiment is configured as a Multi Input Multi Output (MIMO) radar.

The radar apparatus 1 includes an antenna apparatus 2, and can additionally include a transceiver 3, i.e., a transmitter/receiver unit 3, and a processor 4.

Configuration of Antenna Apparatus

Next, the following describes an example of the configuration of the antenna apparatus 2 with reference to FIGS. 2 to 6.

The antenna apparatus 2 includes a multi-layer board having a substantially rectangular-parallelepiped shape.

Figure 3:
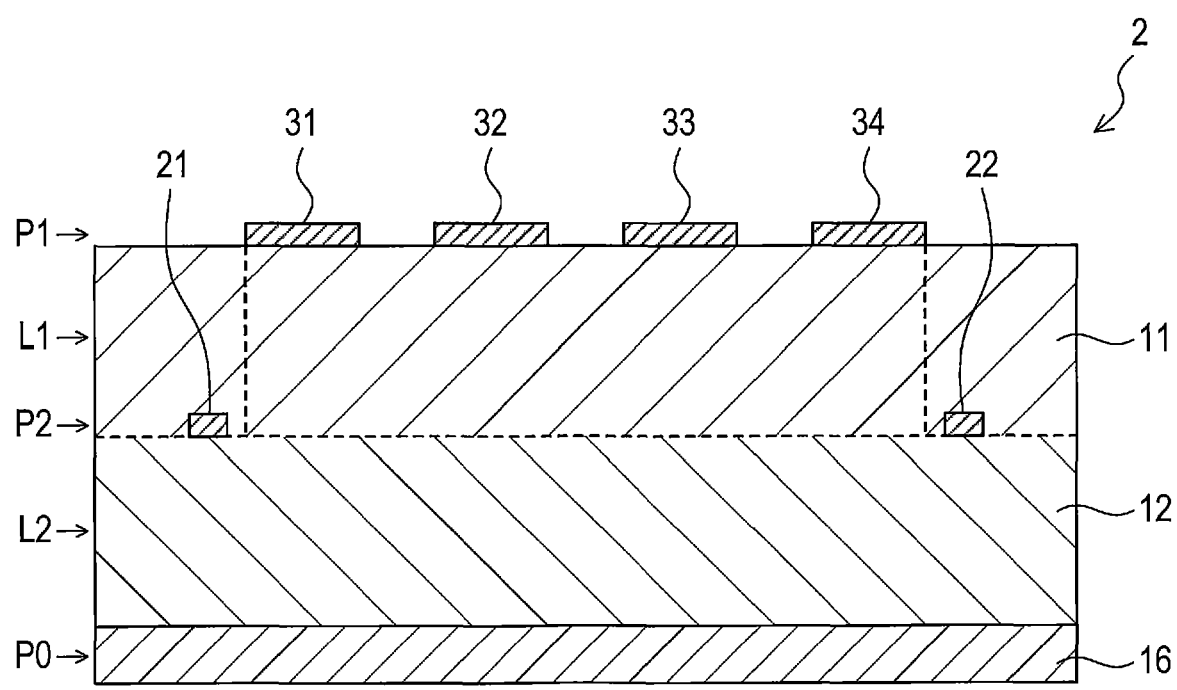
FIG. 3 is a cross sectional view taken along line of FIG. 2.
Figure 4:
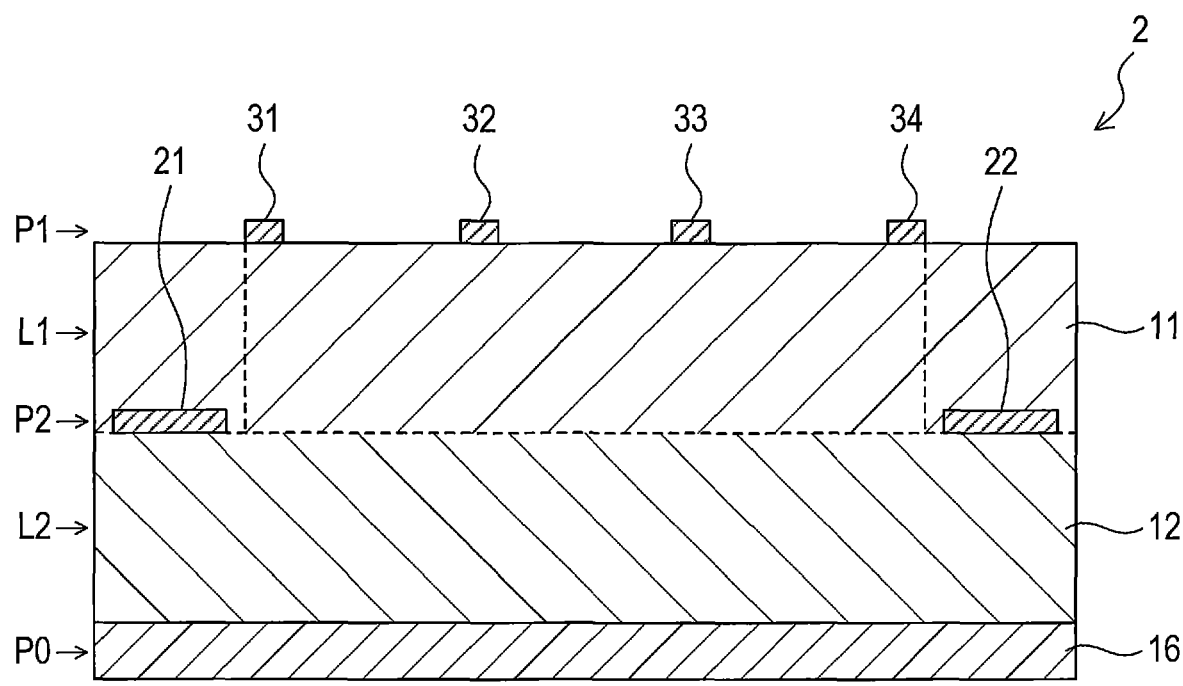
FIG. 4 is a cross sectional view taken along line IV-IV of FIG. 2.
Figure 4:
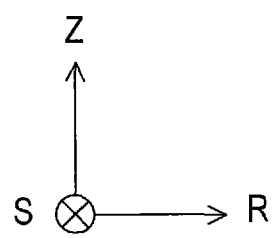
Figure 5:
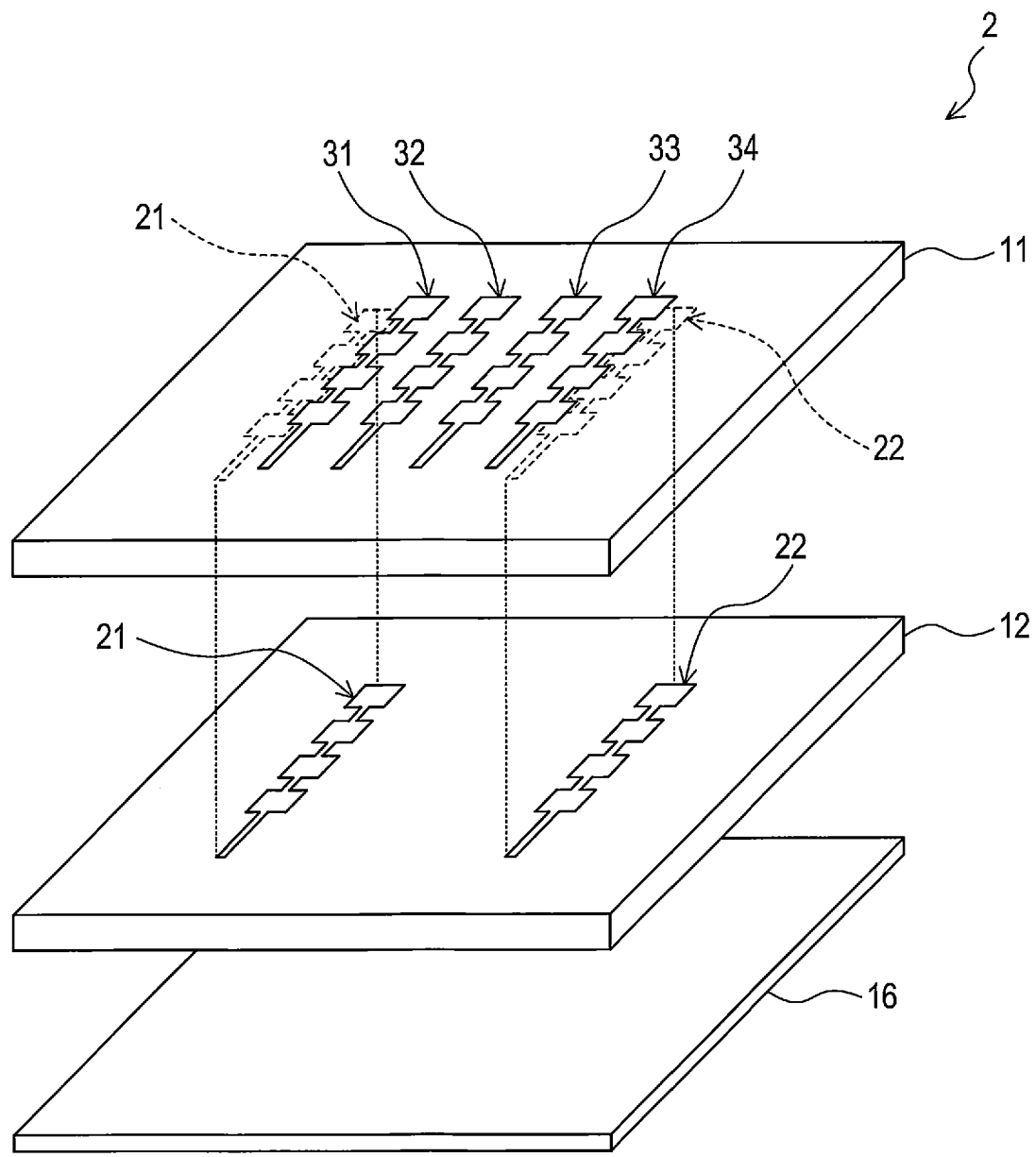
FIG. 5 is an exploded perspective view of the antenna apparatus of the first embodiment.

Specifically, the antenna apparatus 2 includes, as illustrated in FIGS. 3 to 5, a first conductive layer or pattern P1, a second conductive layer or pattern P2, a ground layer P0, a first dielectric member L1, and a second dielectric member L2.

The first conductive pattern P1 serves as a first outside of the antenna apparatus 2, and the ground layer P0 serves as a second outside of the antenna apparatus 2.

The second dielectric layer L2 is mounted on the ground electrode P0, and the second conductive pattern P2 is mounted on the second dielectric layer L2. The first dielectric layer L1 is mounted on the second conductive pattern P2, and the first conductive pattern P1 is mounted on the first dielectric layer L1.

For the antenna apparatus 2, a first direction Z, a second direction R, and a third direction S are defined. The first direction Z is perpendicular to the first and second outsides of the antenna apparatus 2, and extends from the second outside toward the first outside. The second and third directions R and S extends to be perpendicular to the first direction Z. The third direction S is perpendicular to the second direction R. The antenna apparatus 2 has at least one surface that is perpendicular to the first direction Z; the at least one surface will be referred to as a reference plane, which may be abbreviated to an SR plane. The first conductive pattern P1, the second conductive pattern P2, the ground layer P0, the first dielectric layer L1, and the second dielectric layer L2 are parallel to the SR plane.

The ground layer P0 includes a ground plane 16. The ground plane 16 has a substantially plate-like shape and extends parallel to the SR plane. The second dielectric layer L2 includes a second dielectric member 12. The second dielectric member 12 has a substantially thin plate-like shape and extends parallel to the SR plane. The ground plane 16 has a top surface, and the second dielectric member 12 is mounted on the top surface of the ground plane 16.

The antenna apparatus 2 includes a first transmitter antenna 21 and a second transmitter antenna 22, and the first and second transmitter antennas 21 and 22 constitute the second conductive pattern P2. Specifically, the second dielectric member 12 has a top surface, and the first and second transmitter antennas 21 and 22 are mounted on the top surface of the second dielectric member 12.

The first dielectric layer L1 includes a first dielectric member 11. The first dielectric member 11 has a substantially thin plate-like shape and extends parallel to the SR plane. The second conductive pattern P2 has top surfaces, and the first dielectric member 11 is mounted partially on the top surfaces of the second conductive pattern P2.

Specifically, the first dielectric member 11 has a bottom surface, and regions of the bottom surface of the first dielectric member 11 are located to face the respective first and second transmitter antennas 21 and 22, and the remaining region of the bottom surface of the first dielectric member 11 is directly mounted on the top surface of the second dielectric member 12.

The antenna apparatus 2 includes a first receiver antenna 31, a second receiver antenna 32, a third receiver antenna 33, and a fourth receiver antenna 34, and the first to fourth receiver antennas 31 to 34 constitute the first conductive pattern P1. Specifically, the first dielectric member 11 has a top surface, and the first to fourth receiver antennas 31 to 34 are mounted on the top surface of the first dielectric member 11.

The first and second transmitter antennas 21 and 22 are, as illustrated in FIGS. 2 to 5, arranged along the second direction R at a first interval therebetween. The first interval according to the first embodiment represents, in detail, an interval between a phase center of the first transmitter antenna 21 and a phase center of the second transmitter antenna 22. The phase center of any transmitter antenna is defined as a point at which radio waves transmitted from or arriving at the transmitter are virtually deemed to concentrate.

Hereinafter, a term "transmitter antenna" is used according to the first embodiment; the transmitter antenna represents each of the first and second transmitter antennas 21 and 22.

Figure 6:
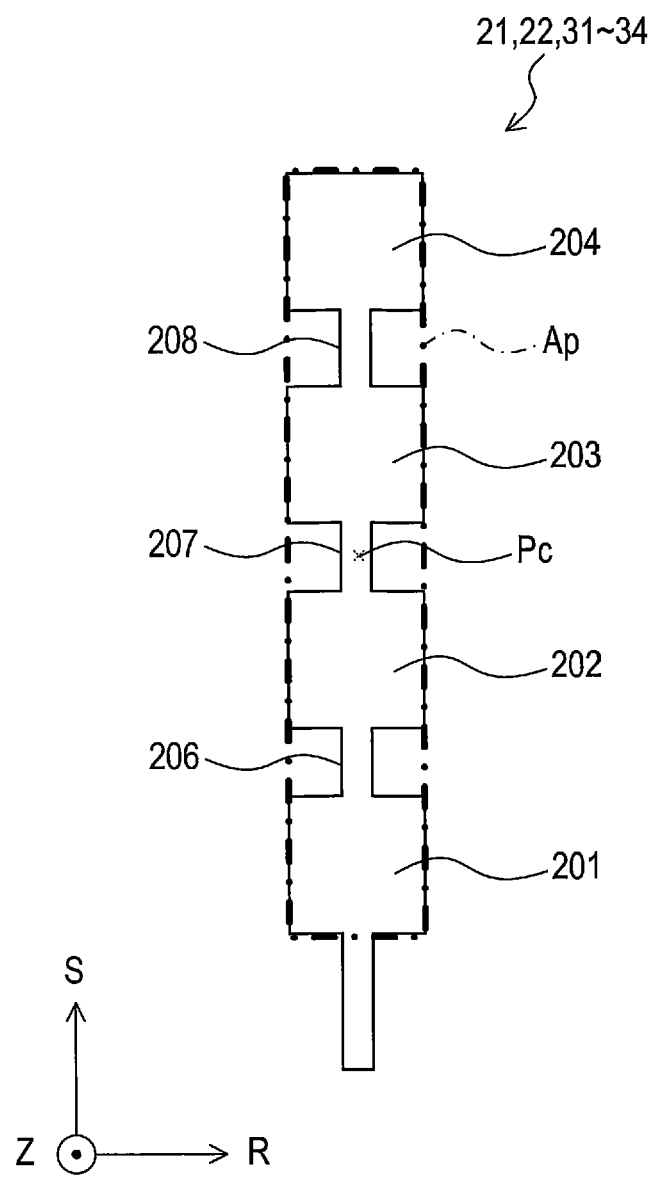
FIG. 6 is a top view of each of transmitter antennas and receiver antennas according to the first embodiment.

The transmitter antenna according to the first embodiment includes, as illustrated in FIG. 6, a first emitter 201, a second emitter 202, a third emitter 203, and a fourth emitter 204. Each of the first to fourth emitters 201 to 204 has a predetermined shaped outline and a predetermined size. Each of the first to fourth emitters 201 to 204 is comprised of, for example, a patch-shaped conductor, in other words, a strip-shaped conductor. The first to fourth emitters 201 to 204 are arranged along the third direction S at equal intervals.

The transmitter antenna additionally includes a first sub feeder 206, a second sub feeder 207, and a third sub feeder 208. The first sub feeder 206 connects between the first and second emitters 202 and 203. The second sub feeder 207 connects between the second and third emitters 203 and 204. The third sub feeder 208 connects between the third and fourth emitters 204 and 205. That is, the transmitter antenna of the first embodiment is configured as, for example, a microstrip array antenna.

The transmitter antenna configured set forth above has a predetermined polarization direction. Specifically, the direction of propagation of main polarized waves from the transmitter antenna is parallel to the third direction S. The transmitter antenna has a predetermined aperture Ap, and the aperture Ap of the transmitter antenna has, as illustrated in FIG. 6, a substantially rectangular shape. The aperture Ap of the transmitter antenna of the first embodiment constitutes a figure substantially circumscribed around the outline thereof. Specifically, the aperture Ap of the transmitter antenna of the first embodiment has a rectangular shape substantially circumscribed around the outline of the transmitter antenna, and extends in a direction parallel or perpendicular to the polarization direction of the transmitter antenna.

The transmitter antenna has, as illustrated in FIG. 6, a phase center Pc that corresponds to, for example, a center of the second sub feeder 207. In other words, the transmitter antenna has, as illustrated in FIG. 6, the phase center Pc that corresponds to, for example, a center of the aperture Ap in each of the third direction S and second direction R.

The transmitter antenna of the first embodiment has an emitting surface, and emits, i.e., transmits, a transmission signal resulting from one or more radio waves from the emitting surface thereof in a predetermined emitting direction. Specifically, the transmitter antenna has a first surface that faces the ground plane 16, and a second surface that is opposite to the first surface; the second surface serves as the emitting surface of the transmitter antenna. The emitting direction intersects with the emitting surface, and has a vector component in the first direction Z.

Figure 2:
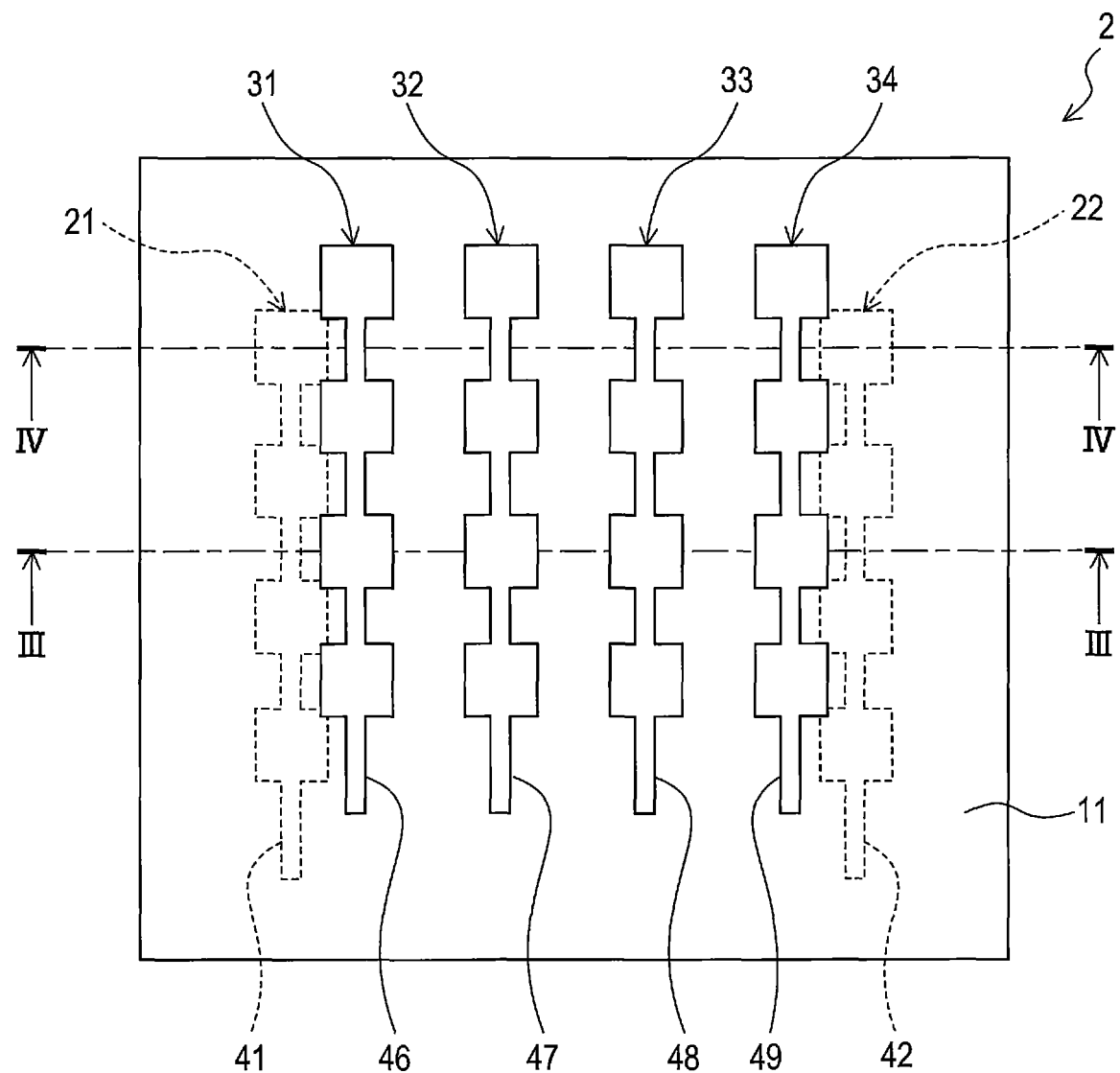
FIG. 2 is a top view of the antenna apparatus of the first embodiment.
Figure 2:
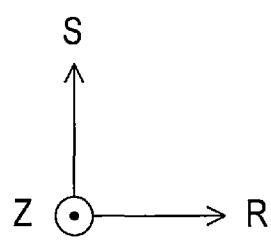

As illustrated in FIG. 2, a main feeder 41 is connected to the first transmitter antenna 21, and a main feeder 42 is connected to the second transmitter antenna 22. The transceiver 3 supplies power to the first transmitter antenna 21 through the main feeder 41, and the transceiver 3 supplies power to the second transmitter antenna 22 through the main feeder 42.

The first to fourth receiver antennas 31 to 34 are, as illustrated in FIGS. 2 to 5, arranged along the second direction R at second intervals. The second interval of any adjacent pair of the first to fourth receiver antennas 31 to 34 according to the first embodiment is defined as an interval between a phase center of one of the adjacent pair of the first to forth receiver antennas 31 to 34 and a phase center of the other of the adjacent pair of the first to fourth receiver antennas 31 to 34.

Hereinafter, a term "receiver antenna" is used according to the first embodiment; the receiver antenna represents each of the first to fourth receiver antennas 31 to 34.

The receiver antenna according to the first embodiment is configured as illustrated in FIG. 6. Specifically, the receiver antenna of the first embodiment has, for example, the same configuration as the configuration of the transmitter antenna, and also has the same dimensions as the dimensions of the transmitter antenna.

That is, the first and second transmitter antennas 21 and 22 and the first to fourth receiver antennas 31 to 34 have a predetermined configuration and predetermined dimensions. The direction of propagation of main polarized waves from each of the first and second transmitter antennas 21 and 22 and the first to fourth receiver antennas 31 to 34 is parallel to the third direction S.

The receiver antenna receives a reflection signal resulting from one or more reflection waves, i.e., echoes, resulting from reflection of the transmission signal transmitted from the transmitter antenna. That is, the reflection waves, i.e., echoes, are radio waves emitted from the transmitter antenna, and, after being reflected by one or more objects external to the antenna apparatus 2, more specifically to the corresponding vehicle, and returned back to the receiver antenna.

As illustrated in FIG. 2, the first receiver antenna 31 is connected to the transceiver 3 through a main feeder 46, and the second receiver antenna 32 is connected to the transceiver 3 through a main feeder 47. Similarly, the third receiver antenna 33 is connected to the transceiver 3 through a main feeder 48, and the fourth receiver antenna 34 is connected to the transceiver 3 through a main feeder 49.

The second interval of each adjacent pair of the first to fourth receiver antennas 31 to 34 is determined in accordance with a detection-target angular range in the horizontal direction that is perpendicular to the third direction S. In contrast, the first interval between the first and second transmitter antennas 21 and 22 is set to a predetermined distance that is suitable for creating a virtual antenna array using the first to fourth receiver antennas 31 to 34.

For example, the first interval can be set to be four times larger than the second interval according to the first embodiment. In other words, the product of the second interval and the number of the receiver antennas, i.e., 4, equals to the first interval.

Let us assume that we try to arrange the first to fourth receiver antennas 31 to 34 between the first and second transmitter antennas 21 and 22 on the top surface of the second dielectric member 12. In this assumption, the first transmitter antenna 21 and the first receiver antenna 31 would physically interfere with each other, such as abutting onto each other, and the second transmitter antenna 22 and the fourth receiver antenna 34 would physically interfere with each other. This physical interference would make it physically difficult to arrange the first to fourth receiver antennas 31 to 34 between the first and second transmitter antennas 21 and 22.

At least one pair of antennas, such as a pair of the first transmitter antenna 21 and the first receiver antenna 31 or a pair of the second transmitter antenna 22 and the fourth receiver antenna 34, which would physically interfere with each other assuming that we try to arrange the first to fourth receiver antennas 31 to 34 between the first and second transmitter antennas 21 and 22 on the same top surface of the second dielectric member 12, will be referred to as at least one pair of interference antennas.

At that time, the interference antennas of at least one pair according to the first embodiment overlap each other as viewed in the first direction Z.

Specifically, as illustrated in FIGS. 2 to 5, the first transmitter antenna 21 and the first receiver antenna 31 according to the first embodiment are arranged to overlap each other as viewed in the first direction Z. Additionally, as illustrated in FIGS. 2 to 5, the second transmitter antenna 22 and the fourth receiver antenna 34 according to the first embodiment are arranged to overlap each other as viewed in the first direction Z.

Note that a situation where an antenna A and an antenna B overlap each other as viewed in the first direction Z means that the antenna A and the antenna B partially or wholly, i.e., at least partially, overlap each other as viewed in the first direction Z while separating from each other in the first direction Z.

Specifically, a situation where an antenna A and an antenna B overlap each other can include
(I) A first situation where the antenna A and the antenna B actually, i.e., physically, overlap each other, that is, a conductor portion of the antenna A and a conductor portion of the antenna B actually overlap each other
(II) A second situation where the aperture Ap of the antenna A and the aperture of the antenna B at least partially overlap each other The first transmitter antenna 21 and the first receiver antenna 31 according to the first embodiment are arranged such that (I) a conductor portion of the first transmitter antenna 21 and a conductor portion of the first receiver antenna 31 partially overlap each other and (II) the aperture Ap of the first transmitter antenna 21 partially overlap the aperture Ap of the first receiver antenna 31.

Similarly, arrangement of the second transmitter antenna 22 and the fourth receiver antenna 34 is identical to the above arrangement of the first transmitter antenna 21 and the first receiver antenna 31.

The first receiver antenna 31 of the first embodiment is, as illustrated in FIGS. 2 to 5, arranged at a far side of the first transmitter antenna 21 in the first direction Z, and the fourth receiver antenna 34 of the first embodiment is, as illustrated in FIGS. 2 to 5, arranged at a far side of the fourth transmitter antenna 24 in the first direction Z.

That is, one receiver antenna, which at least partially overlaps one transmitter antenna as viewed in the first direction Z, is arranged at a far side of the transmitter antenna in the first direction Z. One reason of this arrangement is to reduce attenuation of reflection waves, which arrive at the antenna apparatus 2, before the reflection waves reach the receiver antenna.

Additionally, the first transmitter antenna 21 and the first receiver antenna 31, which at least partially overlap each other, are, as illustrated in FIGS. 2 to 5, arranged such that the phase centers of the antennas 21 and 31 do not overlap each other as viewed in the first direction Z. Similarly, the second transmitter antenna 22 and the fourth receiver antenna 34, which at least partially overlap each other, are, as illustrated in FIGS. 2 to 5, arranged such that the phase centers of the antennas 22 and 34 do not overlap each other as viewed in the first direction Z.

Function of Radar Apparatus

Description of Virtual Antenna Array

The two transmitter antennas and the four receiver antennas of the radar apparatus 1 of the first embodiment create an extended virtual antenna array comprised of (2×4) antennas, i.e., eight antennas.

Note that a technology, which creates, based on M transmitter antennas Tx1 to TxM and N receiver antennas Rx1 to RxN, an extended virtual antenna array comprised of (M×N) antennas, has been already well known in, for example, Japanese Patent Application Publication No. 2019-113481. For this reason, the following briefly describes the technology.

For the same of simplicity of the following description, let us assume that
(I) Each of M and N is set to 2
(II) The two receiver antennas Rx1 and Rx2 are arranged in a predetermined direction at a predetermined interval dR
(III) The two transmitter antennas Tx1 and Tx2 are arranged in the predetermined direction at a predetermined interval dT
(IV) The interval dT is N times, i.e., N=2 times, larger than the interval dR
(V) A target object exists in a direction that is inclined by a predetermined angle $\theta$ with respect to the front direction of the transmitter and receiver antennas Tx1, Tx2, Rx1, and Rx2
(VI) A radio reflection coefficient of the target object is represented by R
(VII) A phase change of a transmission signal based on transmission radio waves, emitted from each of the transmitter antennas Tx1 and Tx2, which has occurred based on propagation of the transmission signal through a path between the target object and the corresponding one of the transmitter antennas Tx1 and Tx2, is represented by $\alpha T$
(VIII) A phase change of a reflection signal based on reflection waves received by each of the receiver antennas Rx1 and Rx2, which has occurred based on propagation of the reflection signal through a path between the target object and the corresponding one of the receiver antennas Rx1 and Rx2, is represented by $\alpha R$ Each of the phase change $\alpha T$ and $\alpha R$ is expressed by a corresponding complex number.

A signal S1, which has transmitted from the transmitter antenna Tx1 and propagated to be received by the receiver antenna Rx1 can be represented by the following expression (1), and a signal S2, which has transmitted from the transmitter antenna Tx1 and propagated to be received by the receiver antenna Rx2 can be represented by the following expression (2). Similarly, a signal S3, which has transmitted from the transmitter antenna Tx2 and propagated to be received by the receiver antenna Rx1 can be represented by the following expression (3), and a signal S4, which has transmitted from the transmitter antenna Tx2 and propagated to be received by the receiver antenna Rx2 can be represented by the following expression (4).

$$S1 = \alpha_T \cdot R \cdot \alpha_R \quad (1)$$

$$S2 = \alpha_T \cdot R \cdot \alpha_R \cdot \exp(jkd_R \sin\theta) \quad (2)$$

$$S3 = \alpha_T \cdot R \cdot \alpha_R \cdot \exp(jkd_T \sin\theta) \quad (3)$$

$$S4 = \alpha_T \cdot R \cdot \alpha_R \cdot \exp(jk(d_T + d_R)\sin\theta) \quad (4)$$

These signals S1 to S4 represented by the respective expressions (1) to (4) are equivalent to signals based on a transmission signal transmitted from one transmitter antenna, which have propagated to be received by four receiver antennas virtually arranged at regular intervals dR in a given direction. That is, although the two receiver antennas Rx1 and Rx2 actually exist, the two receiver antennas Rx1 and Rx2 can be deemed as four receiver antennas virtually arranged at regular intervals dR in a given direction. Such virtually arranged receiver antennas will be referred to as a virtual antenna array.

Because the two transmitter antennas and the four receiver antennas are provided in the antenna apparatus 2, combination of the two transmitter antennas and the four receiver antennas enables an extended virtual antenna array comprised of eight virtually arranged receiver antennas, i.e., virtual eight channels, to be created.

Specifically, as illustrated in FIG. 2, an additional virtual set of first to fourth receiver antennas 31 to 34 can be deemed to be virtually arranged at the right side of the fourth receiver antenna 34, i.e., at the second-direction side relative to the fourth receiver antenna 34, while separating, by the second interval, from the existing set of the first to fourth receiver antennas 31 to 34.

Transceiver

The transceiver 3 is configured to individually supply a transmission signal to each of the first and second transmitter antennas 21 and 22. Specifically, the transceiver 3 is configured to execute known doppler division multiple access (DDMA) on transmission-base signal for the respective first and second transmitter antennas 21 and 22 using one of the transmission-base signals as a local signal, thus creating modulated signals for the respective first and second transmitter antennas 21 and 22. Then, the transceiver 3 is configured to individually supply, to the respective first and second transmitter antennas 21 and 22, the modulated signals, so that the first and second transmitter antennas 21 and 22 simultaneously transmit, based on the respective modulated signals, the transmission signals.

DDMA is a well-known modulation method that enables, from received signals on which the transmission signals are superimposed, the transmission signals to be individually identified. Because DDMA is a well-known modulation method for MIMO radars, an additional detailed description for DDMA is omitted in the present disclosure.

The transceiver 3 is additionally configured to mix the local signal to received signals outputted from the respective first to fourth receiver antennas 31 to 34 to accordingly generate beat signals for the respective first to fourth receiver antennas 31 to 34. Then, the transceiver 3 is configured to supply the generated beat signals to the processor 4.

Processor

The processor 4 includes, for example, a microcomputer comprised of, for example, a CPU 4a and a memory 4b. The memory 4b can be comprised of, for example, semiconductor memories that include a RAM and/or a ROM. The CPU 4a is configured to run one or more programs stored in one or more non-transitory storage media to accordingly implement various functions possessed by the processor 4. The memory 4b serves as the one or more non-transitory storage media according to the first embodiment. That is, executing the one or more programs enables one or more methods corresponding to the one or more programs can be carried out. The processor 4 can include only one microcomputer or plural microcomputers.

The processor 4 is configured to perform at least a target detection task. At least part of all functions possessed by the processor 4 can be implemented by at least one hardware device. For example, if the at least part of all the functions possessed by the processor 4 can be implemented by at least one electronic circuit as the hardware device, the at least one electronic circuit can be comprised of (i) one or more digital circuits, (ii) one or more analog circuits, and (iii) the combination of at least one digital circuit and at least one analog circuit.

The following schematically describes the target detection task carried out by the processor 4.

Specifically, when activated, the processor 4 causes the transceiver 3 to perform radar measurement set forth above to accordingly acquire, for each of the first to fourth receiver antennas 31 to 34, sampling data items of the beat signal outputted from the corresponding one of the first to fourth receiver antennas 31 to 34.

Next, the processor 4 calculates, based on the sampling data items for the first to fourth receiver antennas 31 to 34, eight-channel signals. Specifically, the processor 4 performs, for each of the first to fourth receiver antennas 31 to 34, an FFT analysis on the sampling data items for the corresponding one of the first to fourth receiver antennas 31 to 34 to accordingly calculate a doppler spectrum for each of the first to fourth receiver antennas 31 to 34. The doppler spectrum for each of the first to forth receiver antennas 31 to 34 is comprised of doppler-frequency component included in the received signal of the corresponding one of the first to fourth receiver antennas 31 to 34.

Following the calculation of the eight-channel signals, the processor 4 performs a task of detecting one or more target objects using, for example, digital beam forming (DBF) and the eight-channel signals to accordingly generate, based on the result of the detecting task, target-object information about one or more target objects. The target-object information about one or more target objects represents information related to the one or more target objects that exist within a detectable range of the radar apparatus 1.

Following execution of the detecting task, the processor 4 outputs the generated target-object information about the one or more target objects to non-illustrated various devices.

Advantageous Benefit of First Embodiment

The first embodiment described set forth above achieves the following first to third advantageous benefits.

The following describes the first advantageous benefit.

Specifically, the first transmitter antenna 21 and the first receiver antenna 31 are arranged to overlap each other as viewed in the first direction Z. The second transmitter antenna 22 and the fourth receiver antenna 34 are arranged to overlap each other as viewed in the first direction Z.

More specifically, the first to fourth receiver antennas 31 to 34 are mounted on the first conductive pattern P1, the first and second transmitter antennas 21 and 22 are mounted on the second conductive pattern P2, and the first to fourth receiver antennas 31 to 34 are arranged in an interval region of the first conductive pattern P1. The interval region is located to face an interval region of the second conductive pattern P2; the interval region of the second conductive pattern P2 is located between the first and second transmitter antennas 21 and 22.

The above configuration of the antenna apparatus 2 therefore results in the antenna apparatus 2 having a smaller size.

The following describes the second advantageous benefit.

Specifically, the first receiver antenna 31, which overlaps the first transmitter antenna 21, is arranged at a far side of the first transmitter antenna 21 in the first direction Z, and the fourth receiver antenna 32, which overlaps the fourth transmitter antenna 22, is arranged at a far side of the second transmitter antenna 22 in the first direction Z.

This configuration therefore makes it possible for each of the first to fourth receiver antennas 31 to 34 to receive reflection waves with a smaller level of attenuation of the reflection waves than the case where each of the first and second transceiver antennas 21 and 22 is located at a far side of the corresponding one of the first and fourth receiver antennas 31 and 34 in the first direction Z.

The following describes the third advantageous benefit.

Specifically, the first transmitter antenna 21 and the first receiver antenna 31, which overlap each other, are arranged such that the phase centers of the antennas 21 and 31 do not overlap each other as viewed in the first direction Z. Similarly, the second transmitter antenna 22 and the fourth receiver antenna 34, which overlap each other, are arranged such that the phase centers of the antennas 22 and 34 do not overlap each other as viewed in the first direction Z.

This configuration reduces, on the transmission signals transmitted from the first and second transmitter antennas 21 and 22, an influence from the first and fourth receiver antennas 31 and 34.

Any of the first transmitter antenna 21, the second transmitter antenna 22, the first receiver antenna 31, the second receiver antenna 32, the third receiver antenna 33, and the fourth receiver antenna 34 can serve as an example of any of a first antenna, a second antenna, and a third antenna according to the present disclosure.

As a first instance, each of the first and second transmitter antennas 21 and 22 can serve as an example of the corresponding one of the second and third antennas according to the present disclosure. In this first instance, the first receiver antenna 31 or the fourth receiver antenna 34 can serve as an example of the first antenna according to the present disclosure.

As a second instance, the first transmitter antenna 21 can serve as an example of the first antenna according to the present disclosure. In this second instance, the first receiver antenna 31 and any of the second to fourth receiver antennas 32 to 34 can respectively serve as an example of the second antenna and an example of the third antenna according to the present disclosure.

As a third instance, the second transmitter antenna 22 can serve as an example of the first antenna according to the present disclosure. In this second instance, the first receiver antenna 31 and any of the second to fourth receiver antennas 32 to 34 can respectively serve as an example of the second antenna and an example of the third antenna according to the present disclosure.

Second Embodiment

Figure 7:
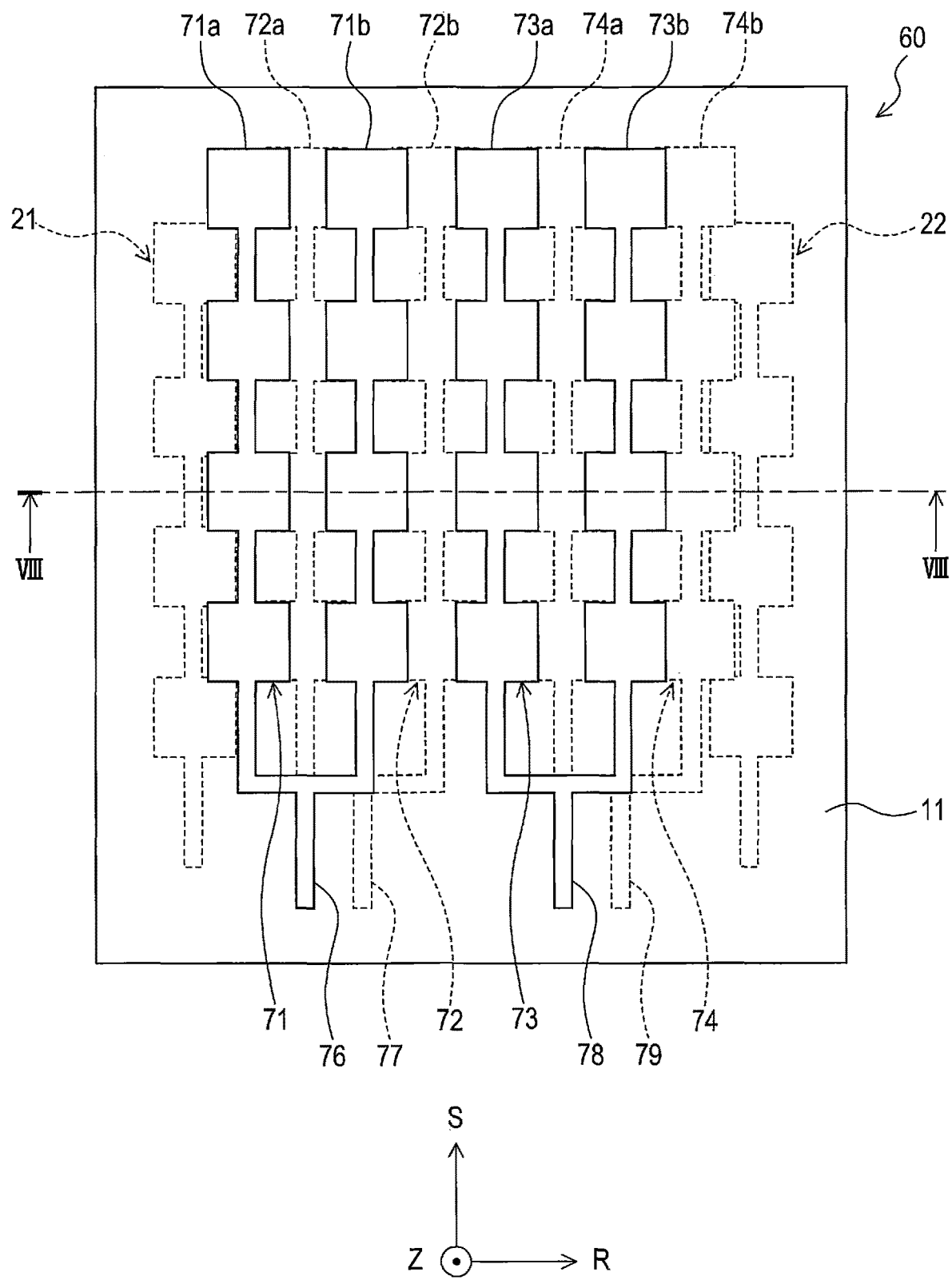
FIG. 7 is a top view of an antenna apparatus of the second embodiment.
Figure 8:
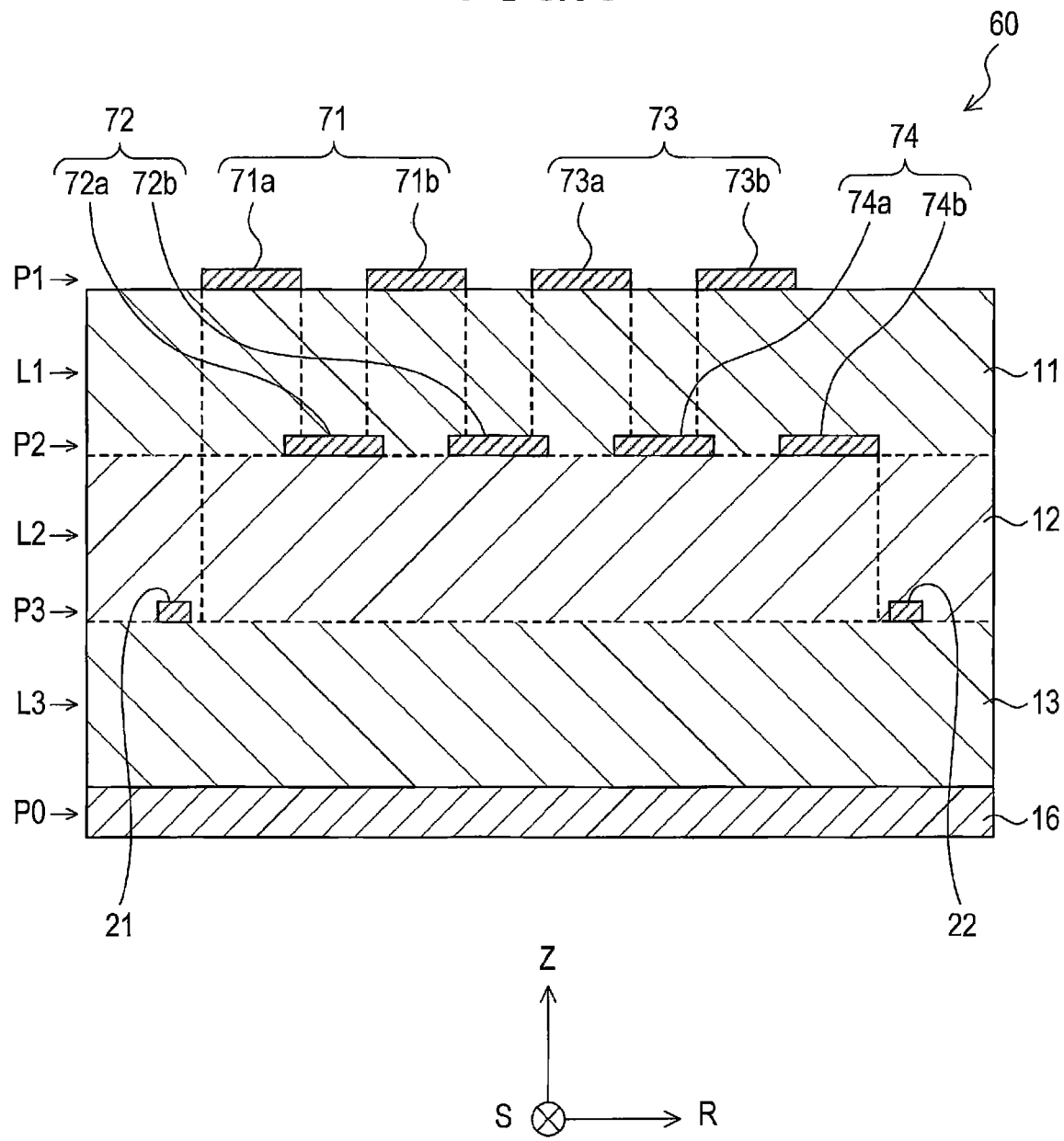
FIG. 8 is a cross sectional view taken along line VIII-VIII of FIG. 7.
Figure 9:
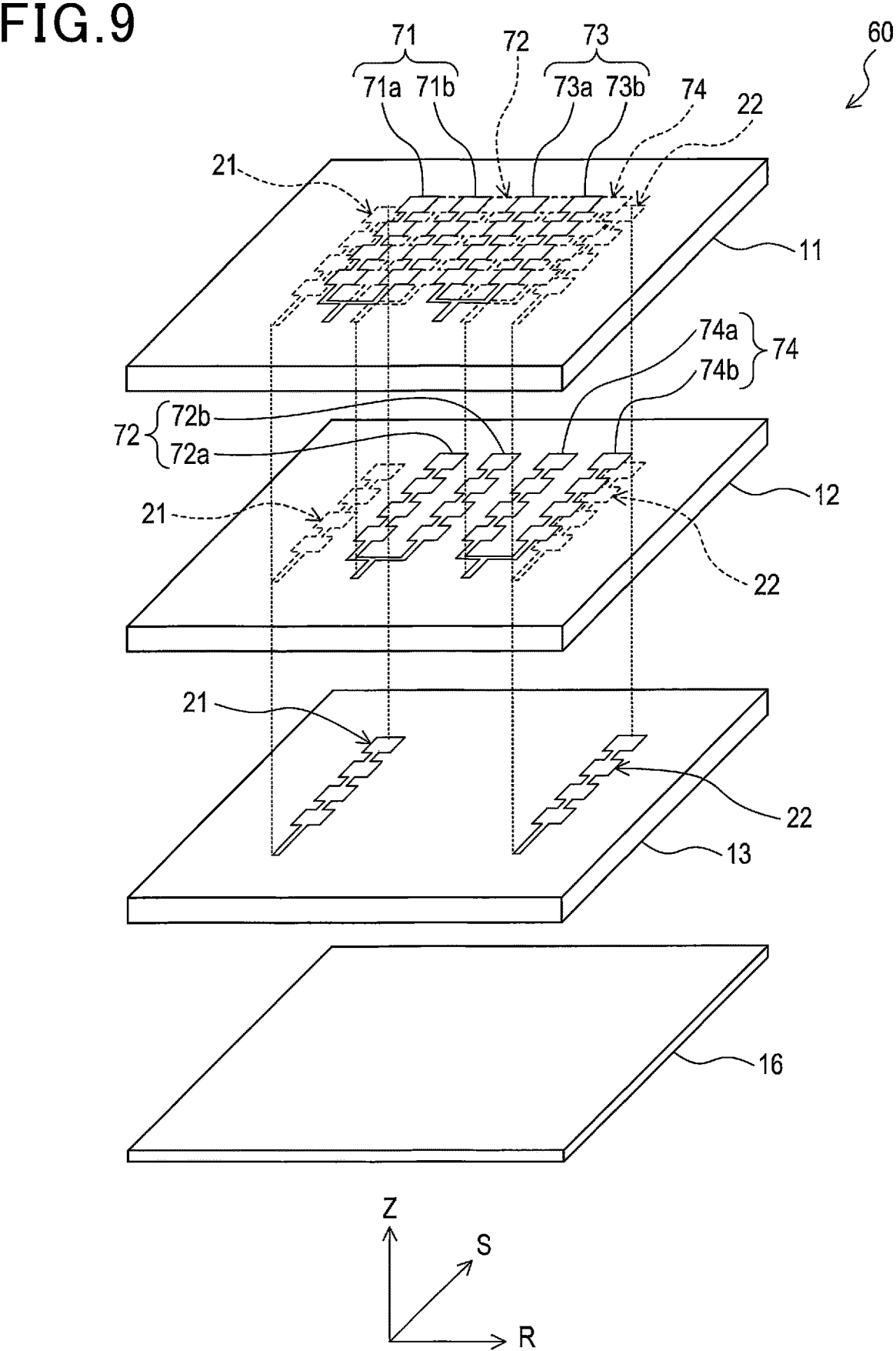
FIG. 9 is an exploded perspective view of the antenna apparatus of the second embodiment.

The following describes an antenna apparatus 60 according to the second embodiment with reference to FIGS. 7 to 9. Major different points between the antenna apparatus 60 of the second embodiment and the antenna apparatus 2 of the first embodiment are that (I) plural transmitter antennas and plural receiver antennas have a three-layer configuration, (II) the configuration of the receiver antennas, and (III) two of the receiver antennas overlap each other.

The following therefore focuses on the major different points of the antenna apparatus 60 from the antenna apparatus 2. As to components of the antenna apparatus 60, to which the same reference characters assigned to the respective corresponding components of the antenna apparatus 2 are assigned, the following refers to the above descriptions of the corresponding components of the antenna apparatus 2 according to the first embodiment.

The antenna apparatus 60 includes a third conductive layer or pattern P3 and a third dielectric layer L3 in addition to the first conductive pattern P1, second conductive pattern P2, ground layer P0, first dielectric member L1, and second dielectric member L2. The third dielectric layer L3 is mounted on the ground electrode P0, and the third conductive pattern P3 is mounted on the third dielectric layer L3. The second dielectric layer L2 is mounted on the third conductive pattern P3.

The third dielectric layer L3 includes a third dielectric member 13. The third dielectric member 13 has a substantially thin plate-like shape and extends parallel to the SR plane. The third dielectric member 13 is mounted on the top surface of the ground plane 16.

That is, the first and second transmitter antennas 21 and 22 of the second embodiment do not constitute the second conductive pattern P2, and but constitute the third conductive pattern P3. Like the first embodiment, the first and second transmitter antennas 21 and 22, which constitute the third conductive pattern P3, are arranged along the second direction R at a predetermined interval therebetween.

The antenna apparatus 60 includes, in place of the first to fourth receiver antennas 31 to 34 of the first embodiment, a first receiver antenna 71, a second receiver antenna 72, a third receiver antenna 73, and a fourth receiver antenna 74.

The first and third receiver antennas 71 and 73, which constitute the first conductive pattern P1, are arranged along the second direction R at a predetermined interval therebetween. The second and fourth receiver antennas 72 and 74, which constitute the second conductive pattern P2, are arranged along the second direction R at a predetermined interval therebetween.

Specifically, the first transmitter antenna 21 and the first receiver antenna 71 are arranged to overlap each other as viewed in the first direction Z, and the second transmitter antenna 22 and the fourth receiver antenna 74 are arranged to overlap each other as viewed in the first direction Z.

Additionally, the first and second receiver antennas 71 and 72 are arranged to overlap each other as viewed in the first direction Z, and the third receiver antenna 73 is arranged to overlap each of the second and fourth receiver antennas 74 as viewed in the first direction Z.

The first receiver antenna 71 is comprised of a first unit antenna 71a and a second unit antenna 71b. Each of the first and second unit antennas 71a and 71b can have, for example, the same configuration as the configuration of any of the first to fourth receiver antennas 31 to 34, such as the first receiver antenna 31, and also can have the same dimensions as the dimensions of any of the first to fourth receiver antennas 31 to 34, such as the first receiver antenna 31.

The first and second unit antennas 71a and 71b are arranged to be separate from each other in the second direction R, and the first and second unit antennas 71a and 71b are connected to a common feeder 76. That is, the first and second unit antennas 71a and 71b are connected to the transceiver 3 through the common feeder 76.

The configuration of each of the remaining second to fourth receiver antennas 72 to 74 is identical to the configuration of the first receiver antenna 71.

Specifically, the second receiver antenna 72 is comprised of a first unit antenna 72a and a second unit antenna 72b. Each of the first and second unit antennas 72a and 72b are connected to a common feeder 77. That is, the first and second unit antennas 72a and 72b are connected to the transceiver 3 through the common feeder 77.

The third receiver antenna 73 is comprised of a first unit antenna 73a and a second unit antenna 73b. Each of the first and second unit antennas 73a and 73b are connected to a common feeder 78. That is, the first and second unit antennas 73a and 73b are connected to the transceiver 3 through the common feeder 78.

The fourth receiver antenna 74 is comprised of a first unit antenna 74a and a second unit antenna 74b. Each of the first and second unit antennas 74a and 74b are connected to a common feeder 79. That is, the first and second unit antennas 74a and 74b are connected to the transceiver 3 through the common feeder 79.

As described above, the first to fourth receiver antennas 71 to 74 are, as illustrated in FIGS. 7 to 9, arranged to overlap each other. This arrangement therefore makes narrower each of (I) the deemed interval between the first and second receiver antennas 71 and 72, (II) the deemed interval between the third and second receiver antennas 73 and 72, and (III) the deemed interval between the third and fourth receiver antennas 73 and 74 even if the length dimension of each receiver antenna 71 to 74 in the second direction R is relatively large. This makes it possible for the radar apparatus 1 to have a wider detectable range.

Third Embodiment

Figure 10:
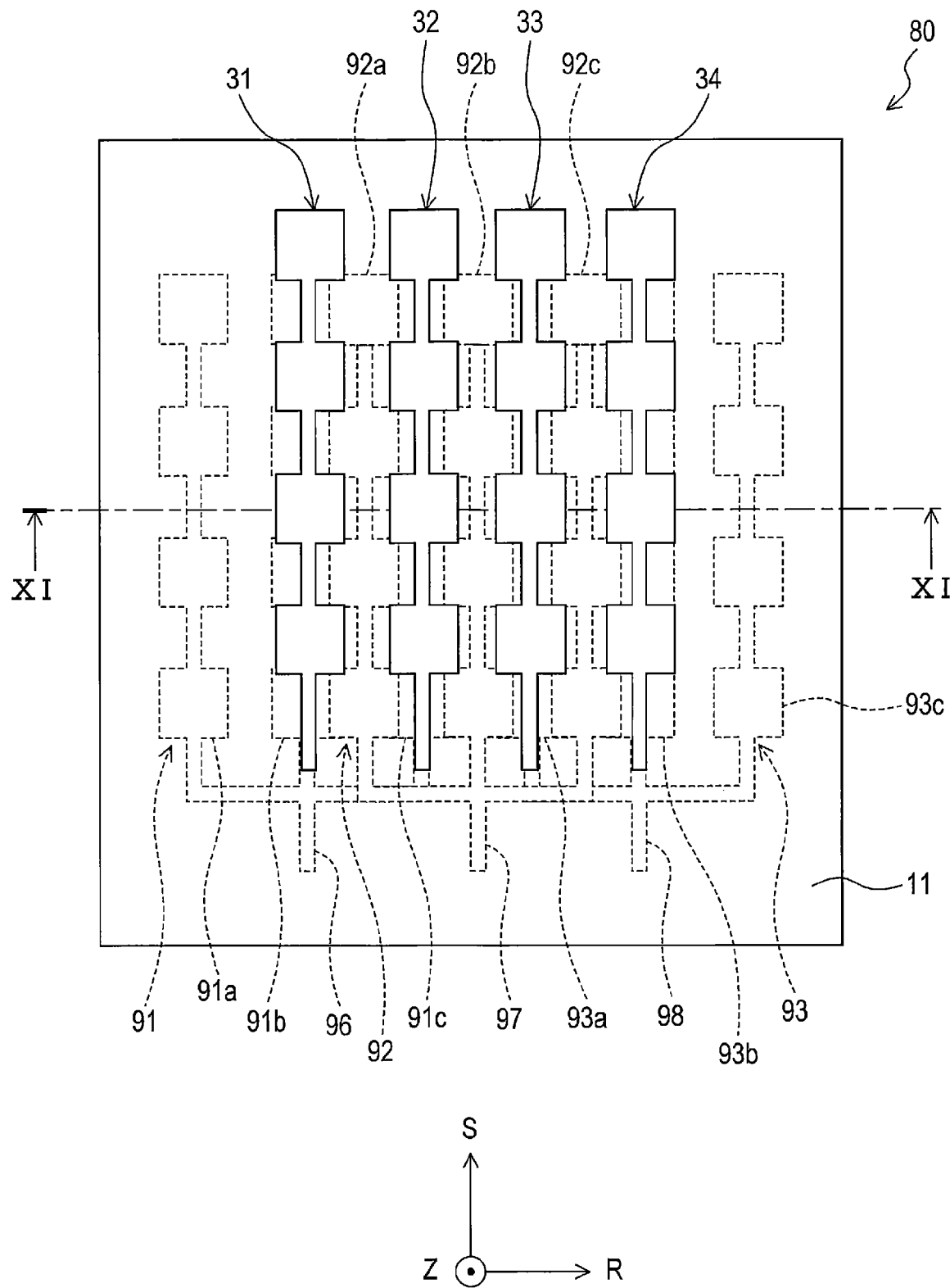
FIG. 10 is a top view of an antenna apparatus of the third embodiment.
Figure 11:
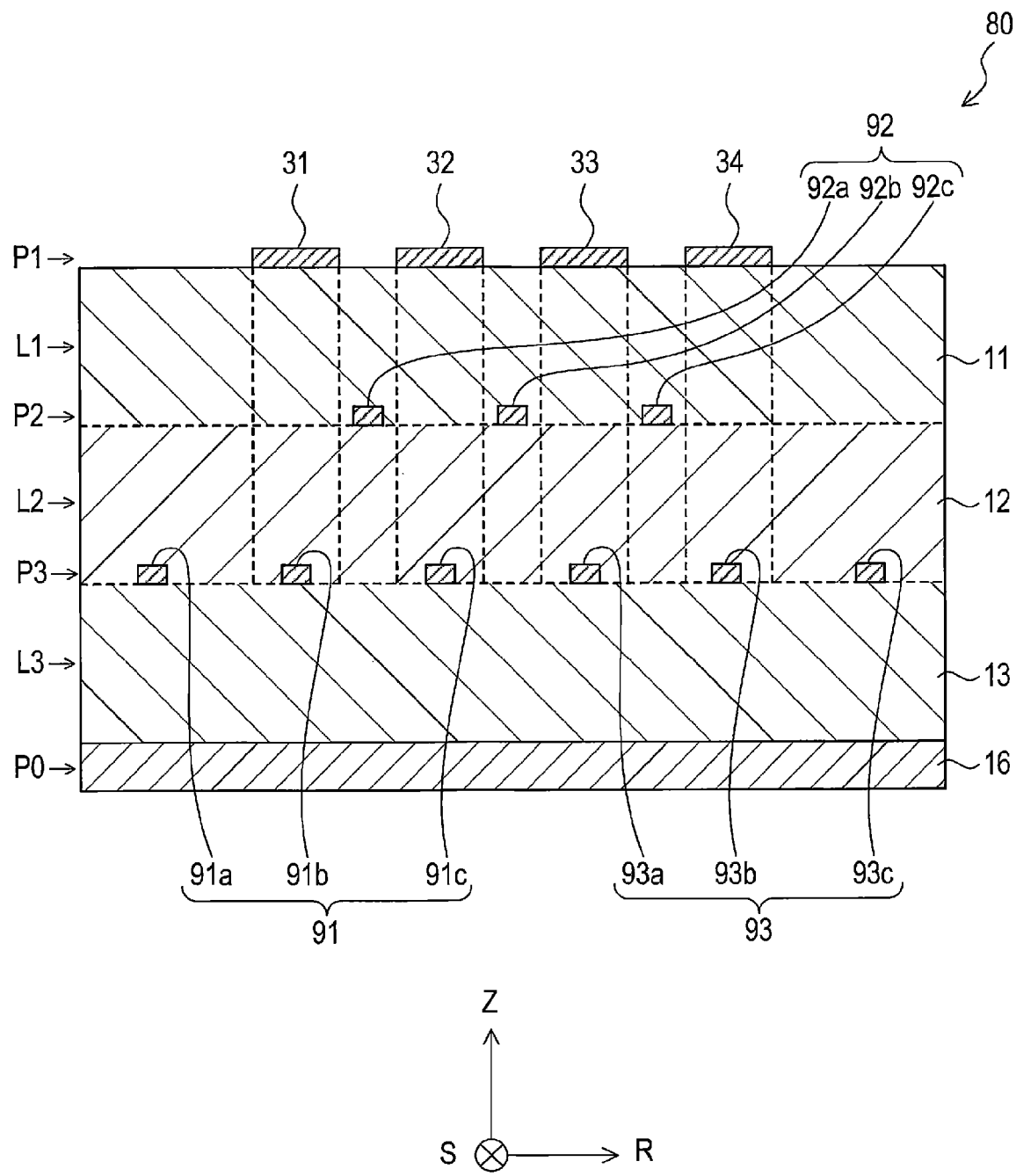
FIG. 11 is a cross sectional view taken along line XI-XI of FIG. 10.
Figure 12:
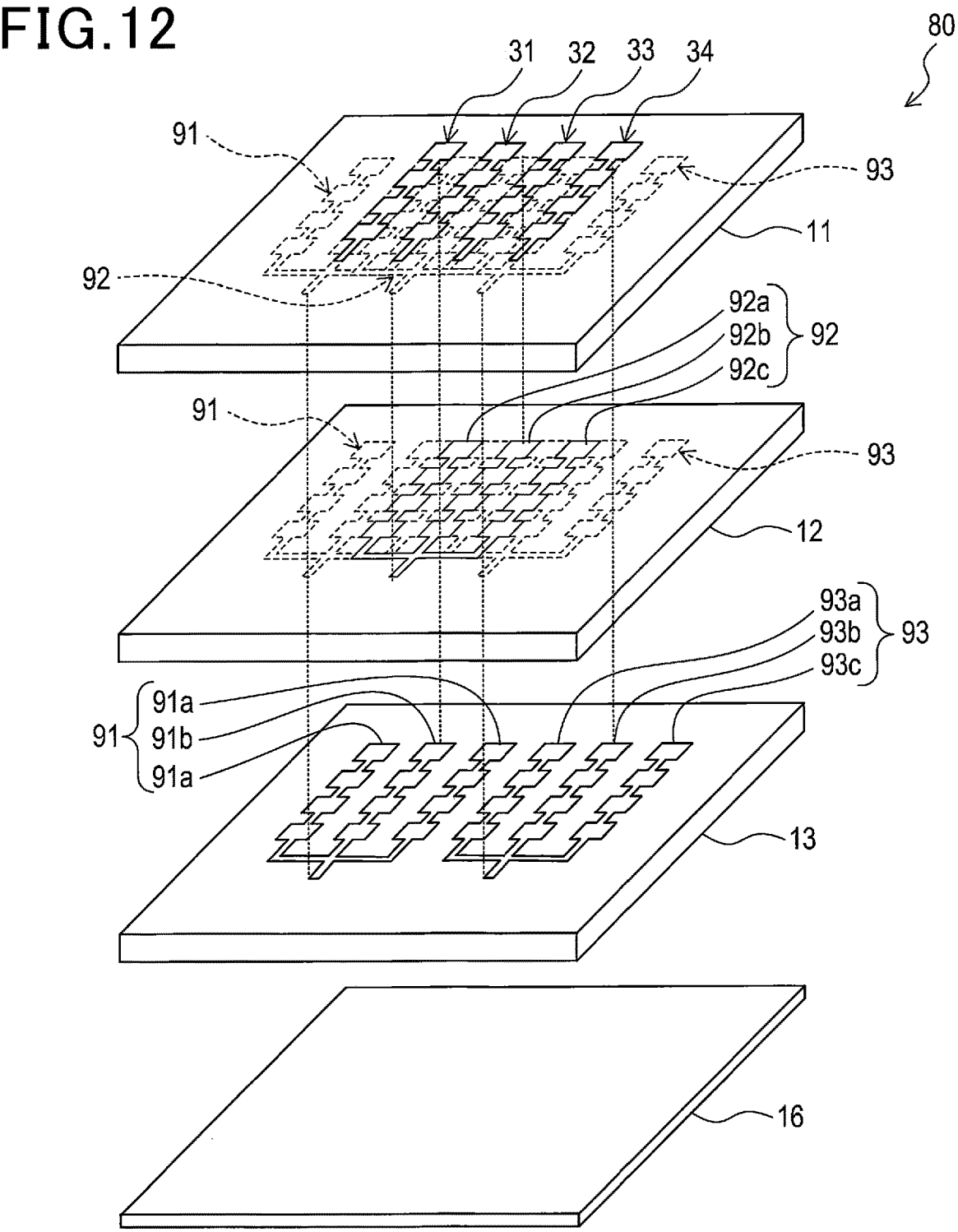
FIG. 12 is an exploded perspective view of the antenna apparatus of the third embodiment.

The following describes an antenna apparatus 80 according to the third embodiment with reference to FIGS. 10 to 12. Major different points between the antenna apparatus 80 of the third embodiment and the antenna apparatus 2 of the first embodiment are that, like the second embodiment, (I) plural transmitter antennas and plural receiver antennas have a three-layer configuration, (II) the configuration of the transmitter antennas, and (III) two of the transceiver antennas overlap each other.

The following therefore focuses on the major different points of the antenna apparatus 80 from the antenna apparatus 2. As to components of the antenna apparatus 80, to which the same reference characters assigned to the respective corresponding components of the antenna apparatus 2 are assigned, the following refers to the above descriptions of the corresponding components of the antenna apparatus 2 according to the first embodiment.

Like the second embodiment, the antenna apparatus 80 includes the first to third conductive patterns P1 to P3, the ground layer P0, and the first and third dielectric layers L1 to L3. The antenna apparatus 80 includes, like the first embodiment, the first to fourth receiver antennas 31 to 34. The first to fourth receiver antennas 31 to 34 are, like the first embodiment, arranged to constitute the first conductive pattern P1.

Additionally, the antenna apparatus 80 includes, in place of the first and second transmitter antennas 31 to 34 according to each of the first and second embodiments, a first transmitter antenna 91, a second transmitter antenna 92, and a third transmitter antenna 93.

The first and third transmitter antennas 91 and 93, which constitute the third conductive pattern P3, are arranged along the second direction R at a predetermined interval therebetween. The second transmitter antenna 92 is arranged to constitute the second conductive pattern P2.

Specifically, the first transmitter antenna 91 and the second transmitter antenna 92 are arranged to overlap each other as viewed in the first direction Z, and the second transmitter antenna 92 and the third transmitter antenna 93 are arranged to overlap each other as viewed in the first direction Z.

Additionally, the first transmitter antenna 91 is arranged to overlap each of the first and second receiver antennas 31 and 32 as viewed in the first direction Z. The second transmitter antenna 92 is arranged to overlap each of the first to fourth receiver antennas 31 to 34 as viewed in the first direction Z. The third transmitter antenna 93 is arranged to overlap each of the third and fourth receiver antennas 33 and 34 as viewed in the first direction Z.

The first transmitter antenna 91 is comprised of a first unit antenna 91a, a second unit antenna 91b, and a third unit antenna 91c. Each of the first to third unit antennas 91a to 91c can have, for example, the same configuration as the configuration of any of the first to fourth receiver antennas 31 to 34, such as the first receiver antenna 31, and also can have the same dimensions as the dimensions of any of the first to fourth receiver antennas 31 to 34, such as the first receiver antenna 31. The first to third unit antennas 91a to 91c are arranged to be separate from each other in the second direction R, and the first to third unit antennas 91a to 91c are connected to a common feeder 96. That is, the first to third unit antennas 91a to 91c are connected to the transceiver 3 through the common feeder 96.

The configuration of each of the remaining second and third transceiver antennas 91 to 93 is identical to the configuration of the first transmitter antenna 91.

Specifically, the second transmitter antenna 92 is comprised of a first unit antenna 92a, a second unit antenna 92b, and a third unit antenna 92c. The first to third unit antennas 92a to 92c are connected to a common feeder 97. That is, the first to third unit antennas 92a to 92c are connected to the transceiver 3 through the common feeder 97.

The third transmitter antenna 93 is comprised of a first unit antenna 93a, a second unit antenna 93b, and a third unit antenna 93c. The first to third unit antennas 93a to 93c are connected to a common feeder 98. That is, the first to third unit antennas 93a to 93c are connected to the transceiver 3 through the common feeder 98.

As described above, the first to third transmitter antennas 91 to 93 are, as illustrated in FIGS. 10 to 12, arranged to overlap each other. This arrangement therefore makes narrower each of (I) the deemed interval between the first and second transmitter antennas 91 and 92 and (II) the deemed interval between the second and third transmitter antennas 92 and 93 even if the length dimension of each transmitter antenna 91 to 93 in the second direction R is relatively large. This makes it possible for the radar apparatus 1 to have a wider detectable range.

Fourth Embodiment

Figure 13:
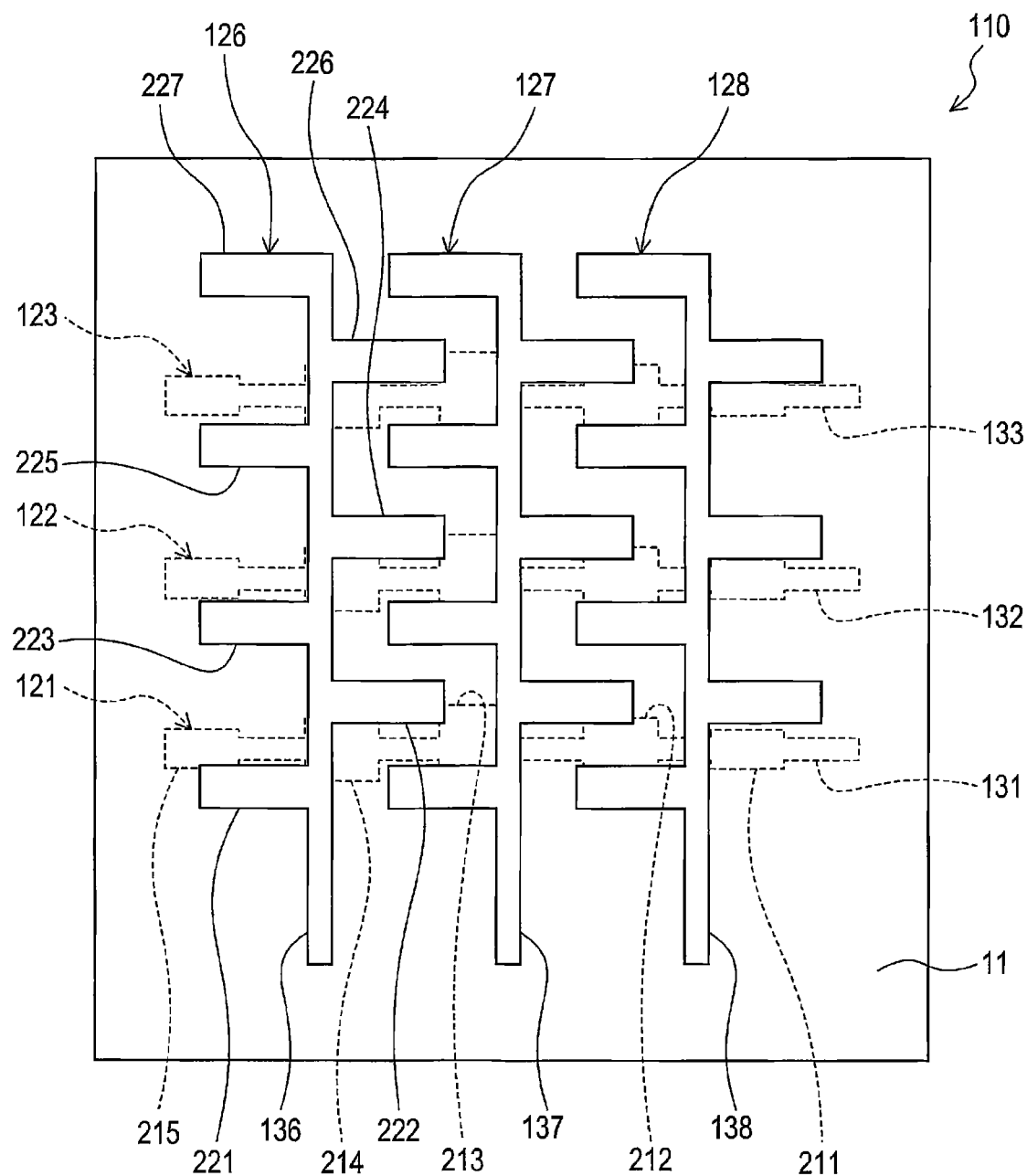
FIG. 13 is a top view of an antenna apparatus of the fourth embodiment.
Figure 13:
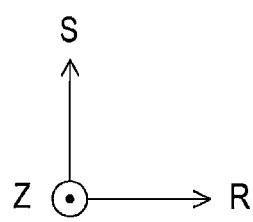

The following describes a modification of each transmitter antenna and a modification of each receiver antenna according to the fourth embodiment with reference to FIG. 13.

Specifically, an antenna apparatus 110 of the fourth embodiment illustrated in FIG. 13 includes a first transmitter antenna 121, a second transmitter antenna 122, a third transmitter antenna 123, a first receiver antenna 126, a second receiver antenna 127, and a third receiver antenna 128.

The first to third transmitter antennas 121 to 123 are arranged to be separate from one another in the third direction S. The first to third transmitter antennas 121 to 123 can be arranged to, for example, constitute the second conductive layer P2.

The first to third receiver antennas 126 to 128 are arranged to be separate from one another in the second direction R. The first to third receiver antennas 126 to 128 can be arranged to, for example, constitute the first conductive layer P1.

The first transmitter antenna 121 is connected to the transceiver 3 through a main feeder 131, and the second transmitter antenna 122 is connected to the transceiver 3 through a main feeder 132. Similarly, the third transmitter antenna 123 is connected to the transceiver 3 through a main feeder 133. The first receiver antenna 126 is connected to the transceiver 3 through a main feeder 136, and the second receiver antenna 127 is connected to the transceiver 3 through a main feeder 137. Similarly, the third receiver antenna 128 is connected to the transceiver 3 through a main feeder 138.

The first transmitter antenna 121 is comprised of a first emitter 211, a second emitter 212, a third emitter 213, a fourth emitter 214, and a fifth emitter 215. The first to fifth emitters 211 to 215 are arranged in this order in the opposite direction of the second direction R to be separate from each other. The first to fifth emitters 211 to 215 are connected to each other through a sub feeder.

The first transmitter antenna 121 configured set forth above has a predetermined polarization direction that is parallel to the second direction R. Each of the second and third transmitter antennas 122 and 123 has the same configuration as the configuration of the first transmitter antenna 121.

The first receiver antenna 126 is comprised of a first emitter 221, a second emitter 222, a third emitter 223, a fourth emitter 224, a fifth emitter 225, a sixth emitter 226, and a seventh emitter 227. The first to seventh emitters 221 to 227 are arranged to extend alternately on both sides of the third direction S. The first to seventh emitters 221 to 227 are connected to each other through a sub feeder.

Like the first transmitter antenna 121, the first receiver antenna 126 configured set forth above has a predetermined polarization direction that is parallel to the second direction R. Each of the second and third receiver antennas 127 and 128 has the same configuration as the configuration of the first receiver antenna 126.

Additionally, each of the first to third transmitter antennas 121 to 123 is arranged to overlap the first to third receiver antennas 126 to 128.

That is, the arrangement direction of the first to third transmitter antennas 121 to 123 included in the antenna apparatus 110 is different from, in particular perpendicular to, the arrangement direction of the first to third receiver antennas 126 to 128 included in the antenna apparatus 110. In contrast, each of the first to third transmitter antennas 121 to 123 has a predetermined polarization direction, and each of the first to third receiver antennas 126 to 128 has the same polarization direction.

The antenna apparatus 110 configured set forth above results in the antenna apparatus 110 having a smaller size.

Figure 14:
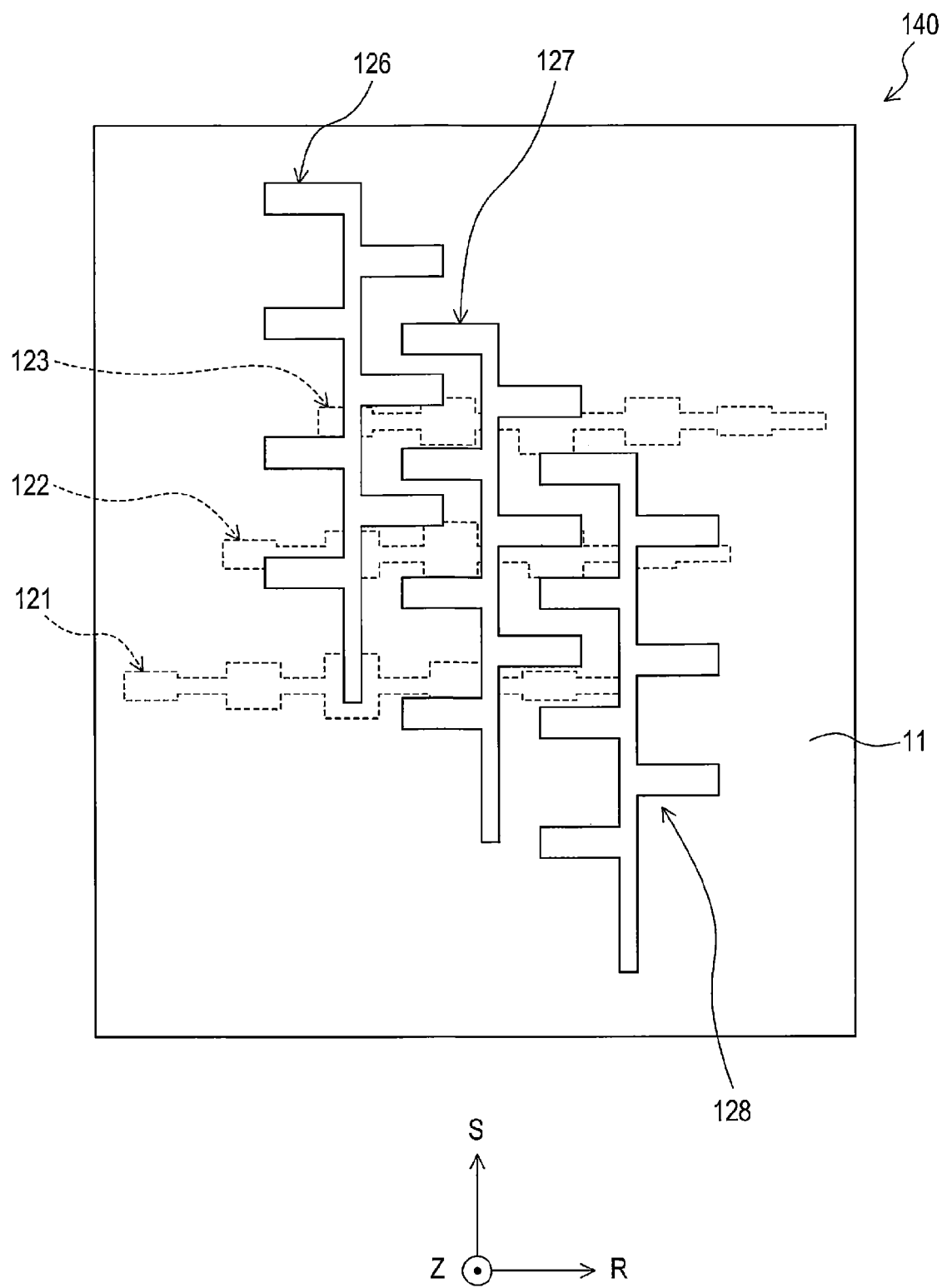
FIG. 14 is a top view of a modification of the antenna apparatus of the fourth embodiment.

As illustrated in FIG. 14 as an antenna apparatus 14, the first to third receiver antennas 126 to 128 can be arranged to be nonparallel and non-perpendicular to the second direction R. Similarly, as illustrated in FIG. 14 as the antenna apparatus 14, the first to third transmitter antennas 121 to 123 can be arranged to be nonparallel and non-perpendicular to the third direction S. In this modification, the arrangement direction of the first to third transmitter antennas 121 to 123 can be perpendicular to the arrangement direction of the first to third receiver antennas 126 to 128.

Fifth Embodiment

Figure 15:
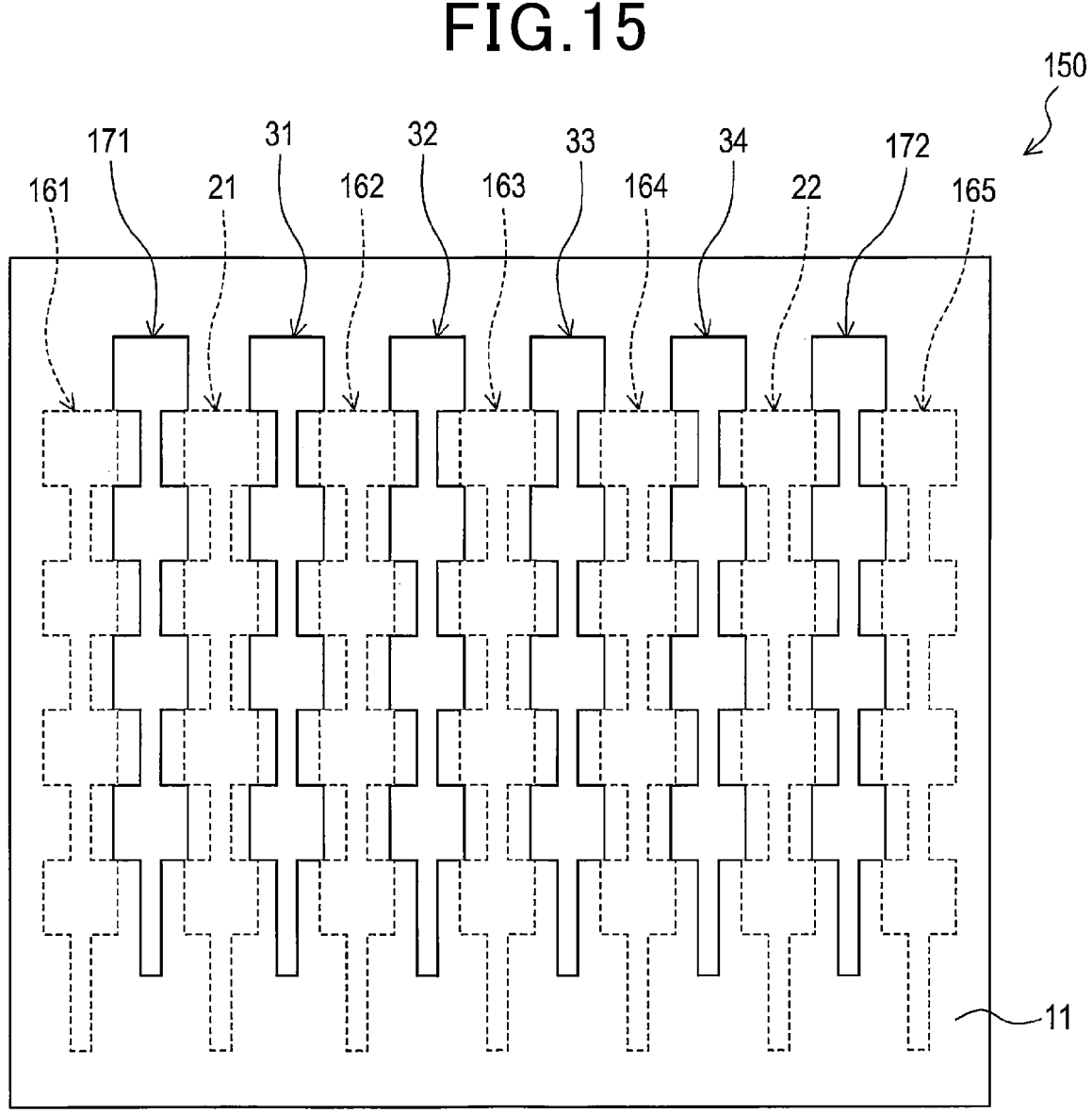
FIG. 15 is a top view of an antenna apparatus of the fifth embodiment.
Figure 16:
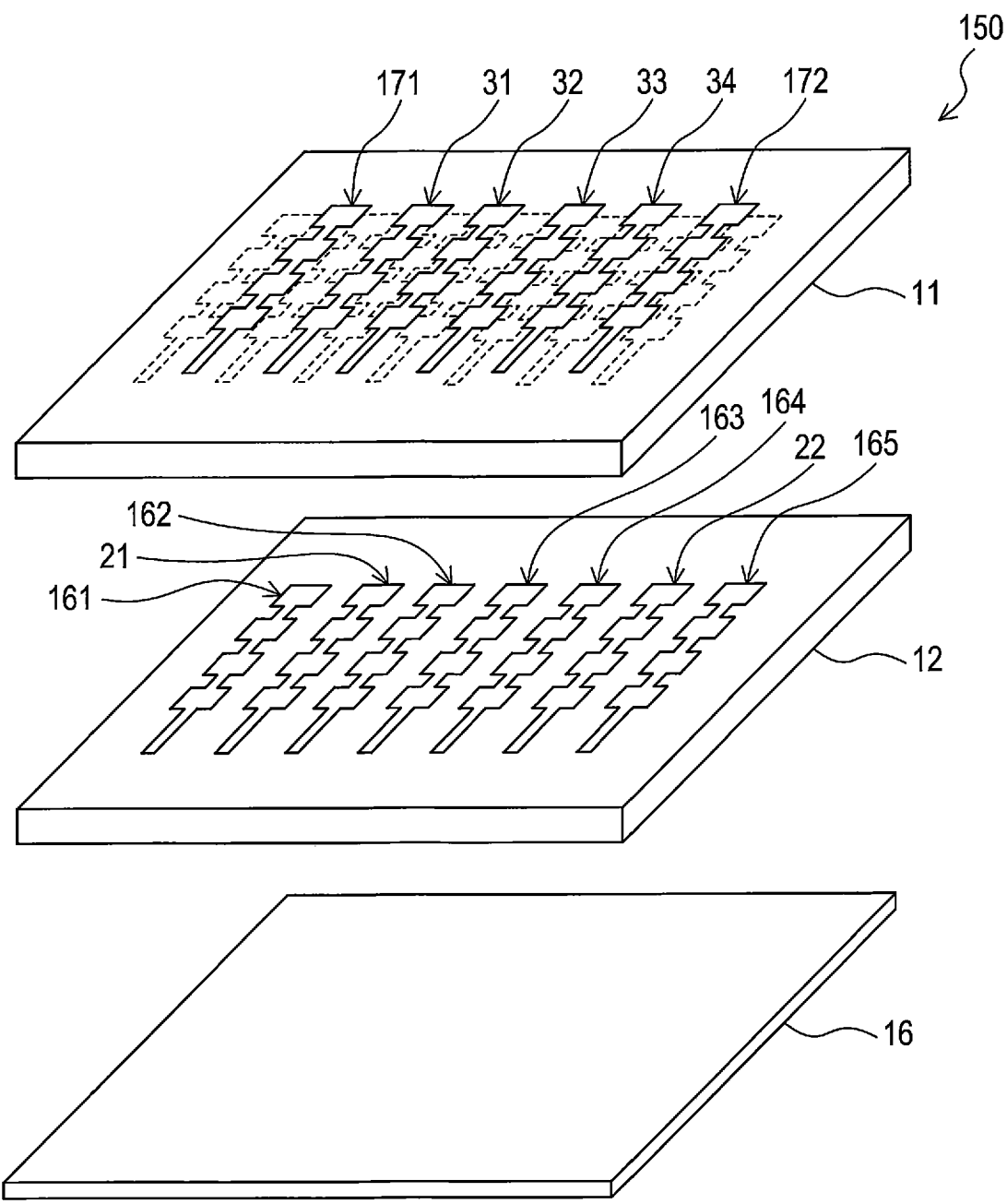
FIG. 16 is an exploded perspective view of the antenna apparatus of the fifth embodiment.

The following describes an antenna apparatus 150 according to the fifth embodiment with reference to FIGS. 15 and 16. The antenna apparatus 150, which has a configuration that is basically identical to the configuration of the antenna apparatus 2 of the first embodiment except that the antenna apparatus 150 additionally includes dummy antennas that include, for example, a first dummy antenna 171, a second dummy antenna 172, and third to seventh dummy antennas 161 to 165.

The first and second dummy antennas 171 and 172 are arranged on the top surface of the first dielectric member 11 to constitute the first conductive pattern P1. The first dummy antenna 171 is arranged to be separate, by the second interval, from the first receiver antenna 31 in the opposite direction of the second direction R. The second dummy antenna 172 is arranged to be separate, by the second interval, from the fourth receiver antenna 34 in the second direction R.

The third to seventh dummy antennas 161 to 165 are arranged on the top surface of the second dielectric member 12 to constitute the second conductive pattern P2. The third dummy antenna 161 is arranged to be separate, by the second interval, from the first transmitter antenna 21 in the opposite direction of the second direction R. The fourth to sixth dummy antennas 162 to 164 are arranged between the first and second transmitter antennas 21 and 22 in the second direction R to keep the second interval between each adjacent pair of the fourth to sixth dummy antennas 162 to 164.

No connection of all the dummy antennas 171, 172, and 161 to 165 to the transceiver 3 results in no power feeding to all the dummy antennas 171, 172, and 161 to 165.

The antenna apparatus 150 configured set forth above achieves the same advantageous benefits as achieved by the first and second embodiments.

Additionally, the above configuration of the antenna apparatus 150 equipped with the dummy antennas makes higher the directivity of each of the receiver antennas that constitute the virtual antenna array. More specifically, the above configuration of the antenna apparatus 150 equipped with the dummy antennas uniformizes, ideally matches, the directivities of the respective receiver antennas that constitute the virtual antenna array.

Modifications

The first to fifth embodiments of the present disclosure have been described. The present disclosure is not limited to the above embodiments, and therefore can be variously modified.

How the plural antennas included in each of the above antenna apparatuses overlap each other can be freely determined. For example, like the first embodiment, at least one transmitter antenna and at least one receiver antenna can be arranged to overlap each other. As another example, like the second embodiment, plural receiver antennas can be arranged to overlap one another. As a further example, like the third embodiment, plural transmitter antennas can be arranged to overlap one another.

Additionally, plural receiver antennas can be arranged to overlap each other without each transmitter antenna overlapping any of the receiver antennas. Similarly, plural transmitter antennas can be arranged to overlap each other without each receiver antenna overlapping any of the transmitter antennas. Plural receiver antennas can be arranged to overlap each other while plural transmitter antennas can be arranged to overlap each other.

Plural receiver antennas may not be always arranged in the same direction, and plural transmitter antennas may not be always arranged in the same direction. The polarization direction of one or more transmitter antennas may not necessarily match the polarization direction of one or more receiver antennas completely. One of the transmitter antenna and receiver antenna can be designed as a linear polarized antenna while the other thereof can be designed as a circular polarized antenna.

At least one receiver antenna, which overlaps at least one transmitter antenna, may not be arranged at a far side of the at least one transmitter antenna in the first direction Z. At least one transmitter antenna, which overlaps at least one receiver antenna, may not be arranged at a far side of the at least one receiver antenna in the first direction Z.

Plural transmitter antennas can be dispersedly arranged in four or more conductive layers, and plural receiver antennas can be dispersedly arranged in four or more conductive layers.

Each antenna apparatus described above can include one or more transmitter antennas and one or more receiver antennas. If any antenna apparatus described above includes a single transmitter antenna, the antenna apparatus always includes plural receiver antennas. If any antenna apparatus includes plural transmitter antennas, the antenna apparatus can include a single receiver antenna. Plural transmitter antennas and plural receiver antennas are required to constitute an extended virtual antenna array.

Each transmitter antenna can have any shape, and each receiver antenna can have any shape. Each transmitter antenna can be comprised of one or more emitters, and each receiver antenna can be comprised of one or more emitters. Each transmitter antenna can have a shape different from the planar shape, i.e., the patch shape, according to each embodiment, and each receiver antenna can have a shape different from the planar shape, i.e., the patch shape, according to each embodiment. Each transmitter antenna can be different in shape from each receiver antenna. Each transmitter antenna can be different in dimension from each receiver antenna.

The antenna apparatuses described in the present disclosure can be used for various apparatuses different from the radar apparatus 1. Each of the antenna apparatuses described in the present disclosure may not be installed in a vehicle.

The functions of one element in each embodiment can be distributed as plural elements, and the function of one element can be implemented by plural elements. The functions that plural elements have can be implemented by one element, and the function implemented by plural elements can be implemented by one element. At least part of the structure of each embodiment can be eliminated. At least part of each embodiment can be added to the structure of another embodiment, or can be replaced with a corresponding part of another embodiment.

The present disclosure can be implemented by various embodiments in addition to the antenna apparatuses; the various embodiments include systems each include at least one of the antenna apparatuses.

The invention claimed is:

1. An antenna apparatus comprising:
at least one first antenna having a reference plane and configured to perform one of:
transmission of a radio-wave signal in a predetermined emitting direction; and
reception of a reflection signal resulting from the transmission signal transmitted in the predetermined emitting direction,
the predetermined emitting direction intersecting with the reference plane and having a vector component in a first direction that is perpendicular to the reference plane;
at least one second antenna configured to perform the other of the transmission of the radio-wave signal and the reception of the reflection signal; and
at least one third antenna configured to perform the other of the transmission of the radio-wave signal and the reception of the reflection signal,
the at least one third antenna being arranged to be separate from the at least one second antenna in a second direction that extends parallel along the reference plane,
at least two of the at least one first antenna, the at least one second antenna, and the at least one third antenna being arranged to:
be separate from each other in the first direction; and
at least partially overlap each other as viewed in the first direction.

2. The antenna apparatus according to claim 1, wherein:
the at least one first antenna and one of the at least one second antenna and the at least one third antenna are arranged to overlap each other as viewed in the first direction.

3. The antenna apparatus according to claim 1, wherein:
the at least one second antenna and the at least one third antenna are arranged to overlap each other as viewed in the first direction.

4. The antenna apparatus according to claim 2, wherein:
the at least one first antenna is configured to transmit the radio-wave signal;
each of the at least one second antenna and the at least one third antenna is configured to receive the reflection signal; and
one of the at least one second antenna and the at least one third antenna, which overlaps the at least one first antenna as viewed in the first direction, is arranged at a far side of the at least one first antenna in the first direction.

5. The antenna apparatus according to claim 2, wherein:
each of the at least one second antenna and the at least one third antenna is configured to transmit the radio-wave signal;

the at least one first antenna is configured to receive the reflection signal transmitted from each of the at least one second antenna and the at least one third antenna; and the at least one first antenna, which overlaps each of the at least one second and third antennas as viewed in the first direction, is arranged at a far side of the corresponding one of the at least one second and third antennas in the first direction.

6. The antenna apparatus according to claim 1, wherein:
each of the at least one first antenna, the at least one second antenna, and the at least one third antenna has a polarization direction; and
the at least one first antenna, the at least one second antenna, and the at least one third antenna are arranged such that the polarization directions of the at least one first antenna, the at least one second antenna, and the at least one third antenna match each other.

7. The antenna apparatus according to claim 1, wherein:
the at least two of the at least one first antenna, the at least one second antenna, and the at least one third antenna, which are arranged to overlap each other as viewed in the first direction, respectively have phase centers; and the at least two of the at least one first antenna, the at least one second antenna, and the at least one third antenna are arranged such that the phase centers of the at least two of the at least one first antenna, the at least one second antenna, and the at least one third antenna do not overlap each other as viewed in the first direction.

8. The antenna apparatus according to claim 1, further comprising a multi-layer board that includes at least one dielectric member, wherein:
the multi-layer board comprises:
a ground layer that includes a ground plane;
a first conductive pattern located parallel to the reference plane and arranged at a far side of the ground layer in the first direction; and
a second conductive pattern located parallel to the reference plane and arranged between the ground layer and the first conductive pattern,
each of the at least one first antenna, the at least one second antenna, and the at least one third antenna being arranged to constitute the first conductive pattern or the second conductive pattern.

* * * * *